(12) United States Patent
Zachut et al.

(10) Patent No.: US 8,931,780 B2
(45) Date of Patent: Jan. 13, 2015

(54) APPARATUS FOR OBJECT INFORMATION DETECTION AND METHODS OF USING SAME

(75) Inventors: Rafi Zachut, Rishon-Lezion (IL); Haim Perski, Hod-Hasharon (IL); Ori Rimon, Tel-Aviv (IL); Amir Kaplan, Hod-Hasharon (IL)

(73) Assignee: N-trig Ltd., Kfar-Saba (IL)

( * ) Notice: Subject to any disclaimer, the term of this patent is extended or adjusted under 35 U.S.C. 154(b) by 767 days.

(21) Appl. No.: 11/463,788

(22) Filed: Aug. 10, 2006

(65) Prior Publication Data

US 2007/0062852 A1 Mar. 22, 2007

Related U.S. Application Data

(60) Provisional application No. 60/707,339, filed on Aug. 11, 2005.

(51) Int. Cl.
*A63F 3/00* (2006.01)
*G06F 3/044* (2006.01)
*A63F 7/06* (2006.01)
*A63F 7/36* (2006.01)

(52) U.S. Cl.
CPC ............ *G06F 3/044* (2013.01); *A63F 3/00643* (2013.01); *A63F 7/06* (2013.01); *A63F 7/068* (2013.01); *A63F 7/0692* (2013.01); *A63F 2003/00662* (2013.01); *A63F 2007/3611* (2013.01); *A63F 2250/265* (2013.01)
USPC .......................................... 273/237; 273/238

(58) Field of Classification Search
CPC .................. A63F 3/00643; A63F 9/24; A63F 2003/00173; A63F 2003/00662; A63F 2003/00665; A63F 2003/00668
USPC .................................................. 273/237–243
See application file for complete search history.

(56) References Cited

U.S. PATENT DOCUMENTS

| | | |
|---|---|---|
| 4,355,300 A | 10/1982 | Weber |
| 4,398,720 A | 8/1983 | Jones et al. |
| 4,541,633 A | 9/1985 | Newbill et al. |
| 4,686,332 A | 8/1987 | Greanias et al. |
| 4,788,386 A | 11/1988 | Matthews et al. |
| 4,817,034 A | 3/1989 | Hardin, Sr. et al. |

(Continued)

FOREIGN PATENT DOCUMENTS

| | | |
|---|---|---|
| DE | 3236374 | 4/1984 |
| EP | 0694856 | 1/1996 |

(Continued)

OTHER PUBLICATIONS

Raymond "The Chess Mysteries of Sherlock Holmes", Rendom House.

(Continued)

*Primary Examiner* — Damon Pierce
*Assistant Examiner* — Allen Chan

(57) ABSTRACT

A system for determining information regarding at least one object, comprising: a sensor sensitive to capacitive coupling; at least one object adapted to create a capacitive coupling with the sensor when at least one signal is input to the sensor; a detector adapted to measure at least one output signal of said sensor associated with the at least one object, wherein the output signal associated with the at least one object is an object information code.

40 Claims, 20 Drawing Sheets

(56) References Cited

U.S. PATENT DOCUMENTS

| | | | |
|---|---|---|---|
| 5,013,047 A * | 5/1991 | Schwab | 273/238 |
| 5,129,654 A | 7/1992 | Bogner | |
| 5,190,285 A * | 3/1993 | Levy et al. | 463/36 |
| 5,365,461 A | 11/1994 | Stein et al. | |
| 5,381,160 A | 1/1995 | Landmeier | |
| 5,402,151 A | 3/1995 | Duwaer et al. | |
| 5,528,002 A | 6/1996 | Katabami | |
| 5,654,643 A | 8/1997 | Bechtel et al. | |
| 5,793,360 A | 8/1998 | Fleck et al. | |
| 5,841,078 A | 11/1998 | Miller et al. | |
| 5,853,327 A | 12/1998 | Gilboa et al. | |
| 5,854,881 A | 12/1998 | Yoshida et al. | |
| 5,923,320 A | 7/1999 | Murakami et al. | |
| 6,005,555 A | 12/1999 | Katsurahira et al. | |
| 6,037,882 A | 3/2000 | Levy | |
| 6,102,397 A * | 8/2000 | Lee et al. | 273/238 |
| 6,133,906 A | 10/2000 | Geaghan | |
| 6,220,594 B1 | 4/2001 | Peng | |
| 6,462,563 B1 | 10/2002 | Kawahara et al. | |
| 6,570,557 B1 | 5/2003 | Westerman et al. | |
| 6,583,676 B2 | 6/2003 | Krah et al. | |
| 6,611,258 B1 | 8/2003 | Tanaka et al. | |
| 6,667,740 B2 | 12/2003 | Ely et al. | |
| 6,690,156 B1 | 2/2004 | Weiner et al. | |
| 6,693,440 B2 | 2/2004 | Basir et al. | |
| 6,835,131 B1 * | 12/2004 | White et al. | 463/1 |
| 6,903,662 B2 | 6/2005 | Rix et al. | |
| 2002/0020807 A1 | 2/2002 | Nougaret et al. | |
| 2002/0037759 A1* | 3/2002 | Aldridge | 463/1 |
| 2003/0079921 A1 | 5/2003 | Yeh | |
| 2003/0098858 A1 | 5/2003 | Perski et al. | |
| 2003/0122795 A1 | 7/2003 | Fujitsuka et al. | |
| 2003/0188899 A1 | 10/2003 | Chao et al. | |
| 2004/0095333 A1 | 5/2004 | Morag et al. | |
| 2004/0105040 A1 | 6/2004 | Oh et al. | |
| 2004/0155871 A1 | 8/2004 | Perski et al. | |
| 2009/0322352 A1 | 12/2009 | Zachut et al. | |

FOREIGN PATENT DOCUMENTS

| | | |
|---|---|---|
| EP | 0701848 | 3/1996 |
| EP | 0718750 | 6/1996 |
| EP | 0727756 | 8/1996 |
| EP | 0737933 | 10/1996 |
| EP | 1331547 | 7/2003 |
| FR | 2759919 | 8/1998 |
| JP | 2002-342033 | 11/2002 |
| WO | WO 98/58237 | 12/1998 |
| WO | WO 99/11344 | 3/1999 |
| WO | WO 02/10791 | 2/2002 |
| WO | WO 2004/021328 | 3/2004 |
| WO | WO 2005/020057 | 3/2005 |
| WO | WO 2007/017848 | 2/2007 |

OTHER PUBLICATIONS

Rekimoto "Augmented Surfaces: A Spatially Continuous Work Space for Hybrid Computing", Proc of Conference on Human Factors in Computing Systems, p. 378-385, 1999.

International Search Report and Written Opinion of the International Searching Authority dated Nov. 12, 2007 received from the International Searching Authority by the Patent Cooperation Treaty Re: PCT Application PCT/IB2006/052773.

Demand and Letter of Dec. 10, 2007 in Response to Written Opinion dated Nov. 12, 2007 Re: PCT Application PCT/IB2006/052773.

International Preliminary Report on Patentability dated Jan. 25, 2008 Re: PCT Application PCT/IB2006/052773.

Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

Response Dated Aug. 5, 2010 to Official Action of May 5, 2010 From the US Patent and Trademark Office Re.: U.S. Appl. No. 12/551,602.

Response to Rule 312 Communication Dated Jan. 6, 2011 From the US Patent and Trademark Office Re. U.S. Appl. No. 12/551,602.

Supplemental Amendment After Allowance Dated Jan. 24, 2011 to Response to Rule 312 Communication of Jan. 6, 2011 From the US Patent and Trademark Office Re. U.S. Appl. No. 12/551,602.

Communication Relating to the Results of the Partial International Search Dated Sep. 3, 2007 From the International Searching Authority Re.: Application No. PCT/IB2006/052773.

Demand and Letter Dated Dec. 10, 2007 in Response to Written Opinion of Nov. 12, 2007 From the International Searching Authority Re.: Application No. PCT/IB2006/052773.

International Preliminary Report on Patentability Dated Jan. 25, 2008 From the International Preliminary Examining Authority Re.: Application No. PCT/IB2006/052773.

International Search Report Dated Nov. 12, 2007 From the International Searching Authority Re.: Application No. PCT/IB2006/052773.

Official Action Dated May 5, 2010 From the US Patent and Trademark Office Re.: U.S. Appl. No. 12/551,602.

Response Dated Oct. 1, 2009 to Official Action of Jun. 11, 2009 From the US Patent and Trademark Office Re.: U.S. Appl. No. 11/463,788.

Response Dated Mar. 19, 2009 to Official Action of Nov. 20, 2008 From the US Patent and Trademark Office Re.: U.S. Appl. No. 11/463,788.

Written Opinion Dated Nov. 12, 2007 From the International Searching Authority Re.: Application No. PCT/IB2006/052773.

Raymond "The Chess Mysteries of Sherlock Holmes", 1994.

Rekimoto et al. "Augmented Surfaces: A Spatially Continuous Work Space for Hybrid Computing Environments", Proceedings of the Conference on Human Factors in Computing Systems, CHI'99, p. 378-385, 1999.

Ullmer et al. "The MetaDESK: Models and Prototypes for Tangible User Interfaces", UIST '97, 10th Annual Symposium on User Interface Software and Technology, Proceedings of the ACM Symposium on User Interface Software and Technology, Banff, Alberta, Canada, ACM Symposium on User Interface Software and Technology, p. 223-232, 1997.

* cited by examiner

APPARATUS FOR OBJECT INFORMATION DETECTION AND METHODS OF USING SAME

RELATED APPLICATIONS

This application claims the benefit under 35 U.S.C. 119(e) of U.S. Provisional Application No. 60/707,339, filed Aug. 11, 2005, the disclosure of which is incorporated herein by reference.

FIELD OF THE INVENTION

The present invention relates generally to detecting information about objects. For example, an apparatus is provided which, as one of its functions, optionally detects position, identification and/or orientation information pertaining to objects located on the apparatus.

BACKGROUND OF THE INVENTION

Numerous methods have been used to detect information about objects, in particular about small objects placed on a surface. The following is by no means a complete review of the field, but rather describes a number of references that illustrate the state of the art.

U.S. Pat. No. 6,690,156, the disclosure of which is incorporated herein by reference, describes a system for identifying and determining the position of game pieces on a game board. One of the methods described uses an excitation coil surrounding the sensor to excite circuitry in the game pieces at its resonant frequency and a sensor on top of the board to acquire signals that are generated by the game pieces in response to the excitation. Based on the excitation and response, the position and identification of the game piece is determined.

US patent publication 2004/0095333, the disclosure of which is incorporated herein by reference, describes a tablet with a structure of orthogonal conductors immediately beneath the tablet surface but on top of a display screen. The tablet also includes a coil surrounding the surface. In operation, a stylus comprises a resonant circuit which is excited by the surrounding coil. A signal generated in response, by the stylus, is acquired by the conductors and is detected. Based on the presence of signals in some of the conductors, the presence and position of the stylus is determined. It is noted that while this reference deals mainly with a stylus and a tablet, the use of the system to determine information regarding game pieces (paragraph 116) is also suggested.

US patent publication 2004/0155871, the disclosure of which is incorporated herein by reference, describes a variant on the system of the previously discussed reference. In general, a dual purpose tablet is described utilizing the same general tablet structure as the previous reference. However, in a series of embodiments, the structure can be modified to also determine the presence of a finger on the surface using the same sensor used for the stylus' detection. In the second of these embodiments (described in paragraphs 163-174 and FIGS. 2 and 3) a signal is fed into conductors that lie in one direction. The finger introduces capacitive coupling between the orthogonal lines so that a signal is detected in those orthogonal lines that are adjacent or beneath the finger. This detected signal is used to determine the presence and position of the finger.

It is noted that each of these references describes using transparent conductors, such that the sensor can overlay an imaging screen such as an LCD screen.

Each of these references includes an extensive review of the prior art in the background section, which is not repeated here. However, this review is incorporated by reference together with the rest of these documents.

SUMMARY OF THE INVENTION

An aspect of some exemplary embodiments of the invention relates to providing an apparatus and/or method for detecting an object information code which is linked to information regarding at least object located on the apparatus based on capacitive coupling between elements of the apparatus that is caused or changed by presence of the object. In an embodiment of the invention, the object is a passive object. In some embodiments of the invention, the object information code is the signal output from the apparatus as a result of the capacitive coupling with the object when a signal is input to the apparatus.

In some exemplary embodiments of the invention, the apparatus comprises a planar board or tablet on which the objects are situated.

In some exemplary embodiments of the invention, information includes the position of the object.

In some exemplary embodiments of the invention, information includes the identification of the object. Optionally, the object information code is detected from a geometric arrangement of tokens on the object. Optionally, the object information code is detected using at least one conductive (or more generally, capacitive) token (e.g., small regions of conductive material associated with a detection surface of the object) or a pattern of tokens located on the object having varying conductivity and/or number and/or spatial arrangement and/or varying conductive signature. In some exemplary embodiments of the invention, the object information code is detected from a pattern of conductive material located on the object having varying conductivity. Optionally, the object information code is detected using a pattern of tokens located on the object having varying size and/or number and/or varying distance between tokens. It should be understood that in some embodiments of the invention, a particular object is not restricted to tokens of a specific size and/or number and/or distance between the tokens, as all of these are variable on the object in order to provide a broad range of identification possibilities for the object. In some exemplary embodiments of the invention, the object is transparent and comprises transparent conductive tokens.

In some exemplary embodiments of the invention, information includes the position of the object. This position is optionally determined by identifying the strongest signal detected by junctions in a sensor array (described below) and then approximating distance from that junction. Optionally, passive reception of a signal on at least one neighboring junction to the object is also used for determining the center of the object. Optionally, the center is detected by weighting an average of signal detections. Optionally, a look-up table is used to correlate signal measurements at a plurality of junctions in a sensor array to an approximate location of an object center. Optionally, the center is calculated by a combination of the methods. Optionally, the center is calculated by averaging the results obtained from the described methods.

In some exemplary embodiments of the invention, information includes the orientation of the object. The objects' orientation and position are optionally detected continuously. Optionally the orientation is determined by detecting an orientation of a pattern of tokens on the object.

In some exemplary embodiments of the invention the object information code is a "security" code which can be associated with a set of objects to be used with a particular copy of software. For instance, all objects sold with the copy of software will have a distinctive pattern, which is known by the copy of software, thus, attempts to copy the software and use it with other objects (e.g. objects which are not associated to that specific copy of software) will not be successful.

In some exemplary embodiments of the invention, one or more objects contain circuitry that transmits a secure object information code to the tablet. This can provide an additional level of security, for example, if the software associated with the objects will not run in the absence of the code. Optionally, a USB security device can be used to enable/disable the software.

Security can also be provided by an RFID tag that may reside in or on the object. If this type of security is provided, the system will require an RFID reader.

In some embodiments of the invention, the objects are hand held objects. In other embodiments, the objects move autonomously on the surface and may be controlled by a controller via a wired or wireless connection. For example, the objects could be in the shape of a car and be motorized.

In some embodiments of the invention, movement of the objects is controlled by a robotic device controlled by a host or remotely via the internet.

In some embodiments of the invention, the object is a body part.

In some exemplary embodiments of the invention, the apparatus can recognize the presence of a finger or hand even when the finger or hand does not actually touch the surface. This allows for a non-contacting finger to move a cursor and, optionally, when the cursor is in a desired position, for finger contact with the surface to be identified in the same way as a mouse click. Optionally a double finger tap or a prolonged duration of contact on the surface is identified as a right click of a mouse. If the prolonged tap is used as a right click, then a double tap could represent a double click.

In some exemplary embodiments of the invention, the apparatus for information detection is comprised of a sensor module situated at or immediately beneath the surface, a controller section and/or a host section. Optionally, the sensor module includes a sensor array, for example an array of elongate transparent electrodes, adapted and constructed to detect information regarding at least one object located on the surface. Optionally, the controller section provides an interface between the sensor section and the host section. Optionally, the host section processes information gathered by the sensor module and provides an output of processed information.

In some exemplary embodiments of the invention, the apparatus displays images. Optionally, the images are displayed on a display screen situated below a surface on which the object is placed and below the sensors that sense the objects or fingers.

In some exemplary embodiments of the invention, the surface functions as a game board and the object is a gaming piece. Optionally, the object represents a player or object taking part in the game.

In some exemplary embodiments of the invention, the object is a stylus. In other embodiments the object can be a game piece (such as a pawn from a chess game), a pointing device (such as a mouse), a card a transparent frame or virtually any physical element that interacts with the sensor.

An aspect of some embodiments of the invention is concerned with an apparatus having a plurality of functions. Optionally one of the functions is to determine the position and optionally the orientation and/or identity and/or the shape or contour of an object on a surface as described above. The objects can be game pieces, a stylus, or other objects whose position is to be determined. Optionally one of the functions is to determine the position of one or more fingers or the contour of a user's palm or hand or other body part on the surface. Optionally one of the functions is to enable the detection of multi-touch on the surface. Optionally one of the functions of the apparatus is to operate as a computer, with the surface optionally operating as the display screen of the computer. Optionally, the display functions as a tablet, with the object being a stylus or other capacitive object.

An aspect of some exemplary embodiments of the invention relates to a method for distinguishing the presence of a capacitive portion of an object (sometimes hereinafter a "token") from a finger. By using the differing electrical responses of a sensor array to touch by an object or a body part (such as a finger) respectively, analysis of these responses can optionally provide identification of the two.

There is thus provided in accordance with an exemplary embodiment of the invention, a system for determining information regarding at least one object, comprising: a sensor sensitive to capacitive coupling; at least one object adapted to create a capacitive coupling with the sensor when at least one signal is input to the sensor; a detector adapted to measure at least one output signal of said sensor associated with the at least one object, wherein the output signal associated with the at least one object is an object information code. Optionally, the at least one object is provided with a pattern of conductive areas containing the object information code. Optionally, the pattern of conductive areas is comprised of conductive tokens. Optionally, the pattern of conductive areas includes conductive and non-conductive areas to provide a binary object information code. Optionally, the pattern of conductive areas is comprised of differently sized conductive areas such that some areas cause a different capacitive coupling than other areas. Optionally, the pattern of conductive areas is comprised of conductive areas, of which at least a first conductive area is located a first distance from a second conductive area which is located a second distance from at least a third conductive area. Optionally, the first and second distances are selected from a set of predefined different distances. Optionally, at least two of the conductive areas are selectively in conductive connection with each other. Optionally, the pattern of conductive areas forms at least one of a plurality of rows, a plurality of columns or a geometric shape. Optionally, the information is at least one of position, identity, or orientation of the object on the sensor. Optionally, the measurement of said at least one output signal is at least one of voltage, amplitude, phase, frequency, or correlation. Optionally, the sensor is comprised of two arrays of electrodes, a first array comprising a first set of electrodes and a second array comprising a second set of electrodes. Optionally, the first and second arrays are orthogonal.

In some exemplary embodiments of the invention, the system further comprises a source of the input signal adapted to input the at least one signal to the first set of electrodes; and, wherein the input signal is transferred to the second set of electrodes by the at least one object capacitively coupled to at least one of the second set of electrodes.

In some embodiments of the invention, the at least one object is one of a plurality of objects, each with a different object information code.

Optionally, the at least one object is a game piece. Optionally, the at least one object is a pointing device.

Optionally, a pointing device is a stylus or mouse.

Optionally, at least one object is a body part of a user.

In some embodiments of the invention, at least one object comprises several surfaces, and wherein each surface comprises an information code. Optionally, at least one object is a gaming die.

In some embodiments of the invention, the system further comprises a display having an image that can be changed electronically displayed thereon. Optionally, the display underlies the sensor and wherein the sensor is substantially transparent.

In some embodiments of the invention, the system is a personal computer.

BRIEF DESCRIPTION OF THE DRAWINGS

Exemplary non-limiting embodiments of the invention are described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. Referring to the following.

DESCRIPTION OF EXEMPLARY EMBODIMENTS

Figure 1A:
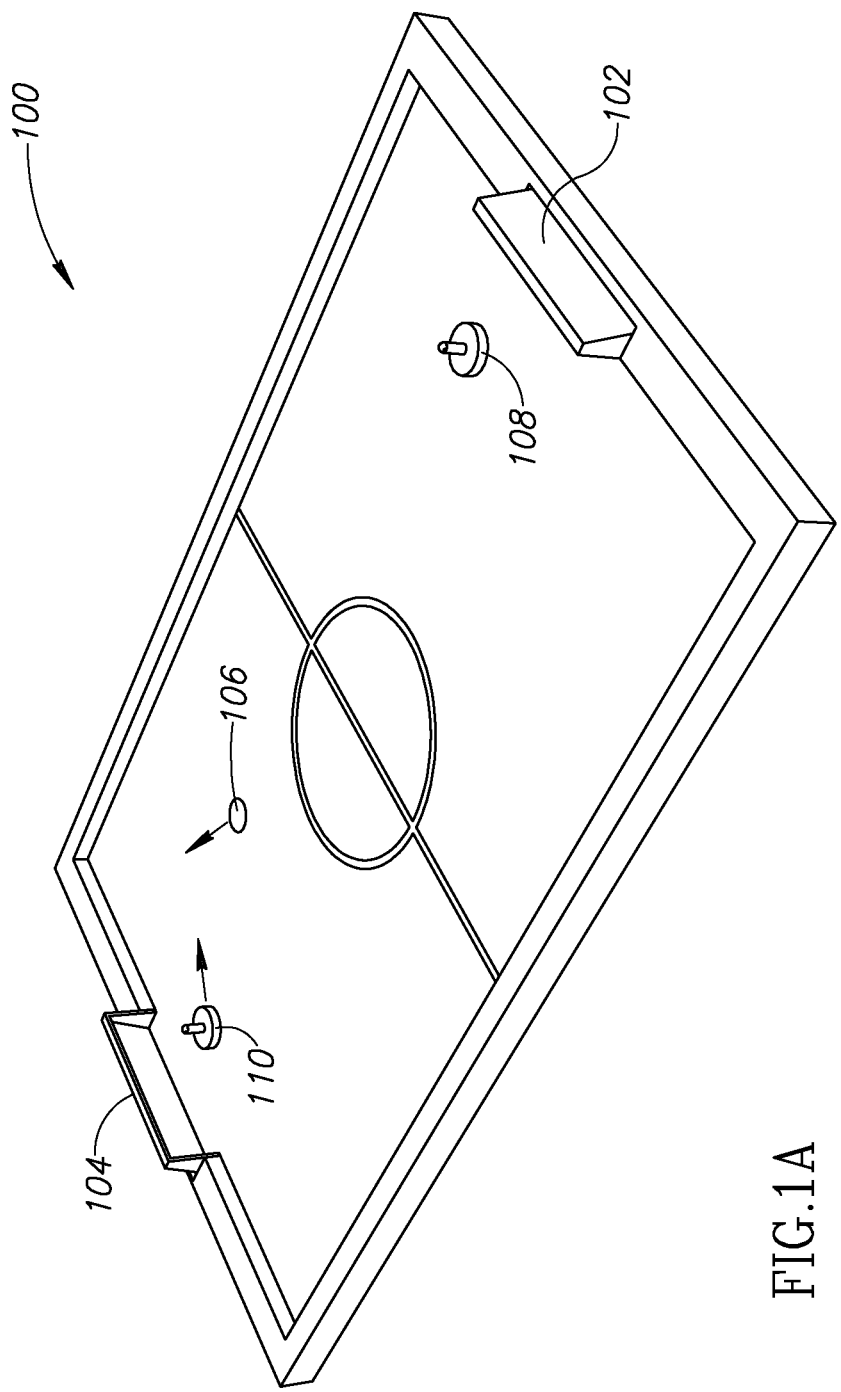
FIG. 1A is a perspective view of an air hockey game board surface, in accordance with an exemplary embodiment of the invention.

FIG. 1A shows a perspective view of an exemplary apparatus 100 for collecting information regarding at least one object, an air hockey game board, in accordance with an exemplary embodiment of the invention. The illustrated game board is purely exemplary and its external structure and features may vary from the board shown, for example as shown with respect to FIGS. 1B and 1C. In a conventional air hockey arrangement, apparatus 100 for collecting information is provided with a plurality of objects including two goals, 102, 104 one at either end of the game board. Naturally, the object of the game is to score by getting another object, a puck 106, into the opponent's goal 102 or 104 more often than your opponent up to some predetermined score. Puck 106 is typically hit using other objects, paddles 108, 110, which are held in at least one hand by the players.

In an embodiment of the invention, a representation of the physical game board is shown on a display, optionally along with the real-time information collected by apparatus 100 and related to puck 106, paddles 108, 110, and optionally goals 102, 104 (which do not actually move in this game). Optionally, the game board and/or objects used in the game, such as puck 106, are projected on a display located under a sensor array (such as described below). Real-time information related to these objects includes at least one of position, velocity, orientation, identity and/or acceleration. In an embodiment of the invention, apparatus 100 detects at least some information related to an object continuously. In some embodiments of the invention, apparatus 100 detects output object information codes related to the objects which are the result of an input signal applied to a sensor array (described below and assigned reference number 203) above or beneath the game board. In an embodiment of the invention, the object information codes correspond to information related to the objects, for example position, orientation, and/or identity.

Figure 1B:
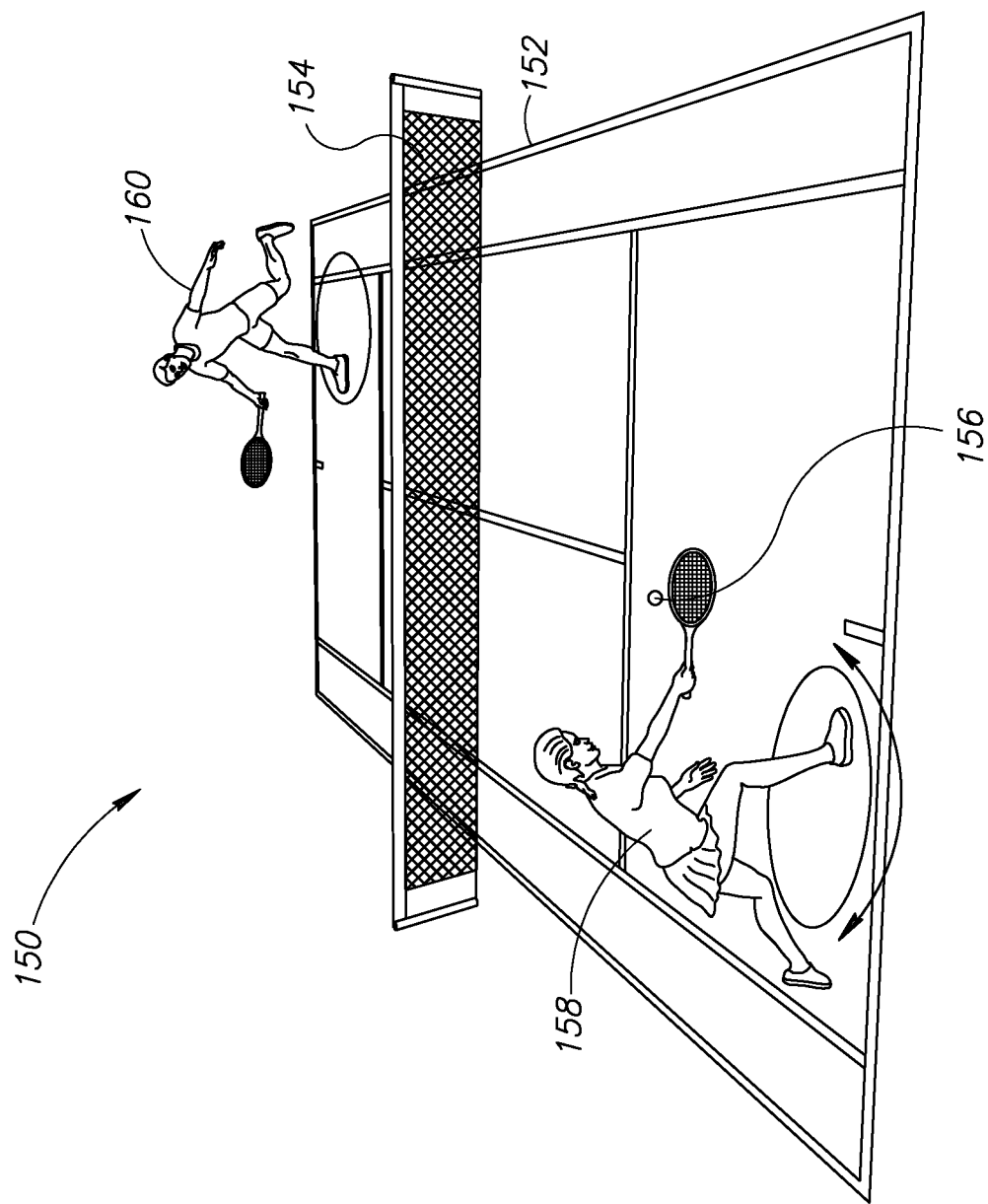
FIG. 1B is a view of how a game of tennis would appear to the user, in accordance with an embodiment of the invention.

FIG. 1B shows a representation 150 of a tennis game in accordance with an embodiment of the invention. As in the real world, the game includes a tennis court 152, including a net 154, a ball 156 and two players 158 and 160. In the disclosed embodiment, all of the components of the game are on the screen, except for the two players 158 and 160. As described in more detail below, the apparatus for collecting information 100 is optionally capable of not only identifying the game pieces and determining their position, but also of determining the orientation of the piece. Since the position and orientation can be determined within a very short time (e.g. in a fraction of a millisecond or less) this allows for substantially continuous determination of these parameters. In an embodiment of the invention, apparatus 100 provides a very high resolution at least in position and orientation of the object, therefore hence even a small change of the object's position and/or orientation, only few mm in some embodiments of the invention, is detected (sensed) by sensor array 203.

In operation, in playing the illustrated tennis game, each player moves and rotates his or her game piece in order to place the racket at the ball and also to rotate the game piece so that the ball is "hit" by the racket. The ball is moved, on the screen, responsive to a determination by a computer host that the ball was hit and when and how it was hit.

This embodiment is provided for illustrative purposes to demonstrate how continuous determination of the position and orientation could be used in a game and to illustrate, at least in part, the additional dimension that would be available to a game designer.

It should be noted that while games have been shown, other uses for such a system will immediately occur, such as for use in command and control systems, education, simulation and training. The size, external structure, response time and resolution of the board may vary, dependent on the use for which it is intended.

Figure 1C:
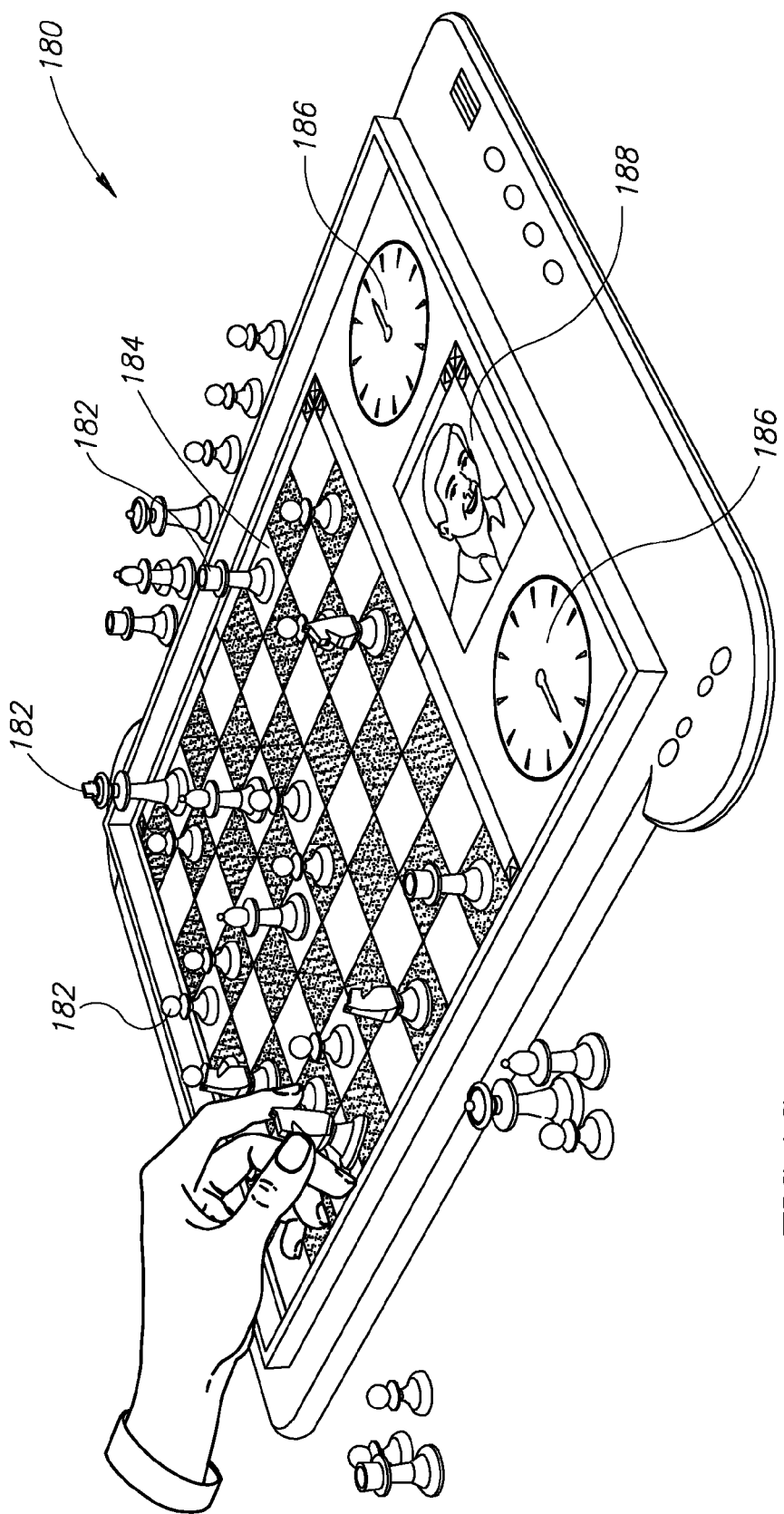
FIG. 1C is an exterior perspective representation of a game board, in accordance with an exemplary embodiment of the invention.

FIG. 1C shows an exemplary apparatus for collecting information 180, illustrated in the form of a game board, in accordance with an exemplary embodiment of the invention. The illustrated game board is purely exemplary and its external structure and features may vary from the board shown.

The illustrated game is a chess game with a plurality of game pieces 182 (sometimes referred interchangeably as "objects") and a game playing surface 184 on which the objects 182 are placed. In an embodiment of the invention the game pieces can be identified by sensing apparatus (not shown but illustrated with respect to a sensor section 202, below) situated at least partly on or beneath surface 184.

In some embodiments of the invention, surface 184 is the surface of, or overlays, a display screen such that the game board layout can be easily changed by software. In addition, provision of such a variable display screen allows for the display of one or more timers 186 and even the picture 188 or other identification of the person whose move it is. The board can also provide an indication of an illegal move, for example, by flashing the square on which an illegally moved object 182 is placed or can indicate a suggested move, for example, by lighting up a starting and ending square. It is also possible to play "against the machine" with the board indicating the place to which game pieces are to be moved.

Optionally, two separate game boards can be connected. In an embodiment of the invention, one of the computers acts as a master and the other as a slave, or both are connected to a common host, although this is not compulsory. This type of connection could be used, for example, to allow for the playing of games in which the players do not see each others game boards, such as for example, a form of "naval battles." The connection could be wired via a USB or RS 232 connection or the like or can be wireless (Bluetooth or an IR connection, for example) or via the internet Methods for connecting two tablets to a common host and in a master/slave configuration are shown, for example in a US patent application filed Jul. 14, 2005 entitled "Automatic Switching for a Dual Mode Digitizer by applicants Haim Perski and Ori Rimon, the disclosure of which is incorporated herein by reference.

Furthermore, the game boards do not have to be rectangular, although this is often a convenient shape. Optionally, in some embodiments of the invention, the game board may be curved. Optionally, the game surface can be made flexible to allow for a three dimensional appearance to the games (for example in a racing game).

Figure 2:
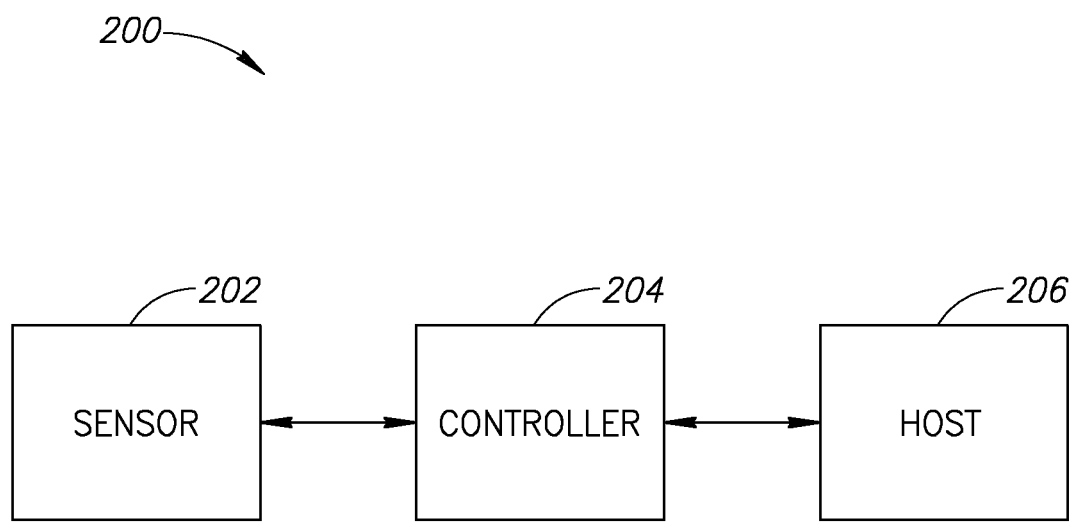
FIG. 2 is a generalized block diagram depicting an apparatus for detecting information, in accordance with an exemplary embodiment of the invention.

FIG. 2 shows a block diagram 200 of hardware sections which comprise apparatus for detecting information 100, in accordance with an exemplary embodiment of the invention. Sensor section 202 is provided to an apparatus for detecting information 100, in some exemplary embodiments of the invention, which includes a sensor array 203 (shown in FIG. 3) and is adapted and constructed to detect information regarding at least one object 102 located thereon. An exemplary sensor section 202 is described in more detail below.

Apparatus for detecting information 100 is also provided with an optional host section 206, in some exemplary embodiments of the invention. Host section 206 optionally processes information gathered by the sensor section and provides an output of processed information, for example to the surface 104 and/or to software configurable elements such as those referenced by reference numbers 106 and 108 in FIG. 1A. Optionally, host section 206 displays images, optionally on (generally underneath) surface 104.

Optionally, host section comprises a separate display, such as a liquid crystal display (LCD). Optionally, audio is provided to accompany the play.

In some exemplary embodiments of the invention, host section 206 functions as a PC. Optionally, host section 206 functions as a tablet PC.

Sensor section 202 and/or host section 206 are optionally in operative communication with a controller section 204, an exemplary embodiment of which is described in further detail below. Controller section 204 optionally provides an interface between sensor section 202 and host section 206.

Figure 3:
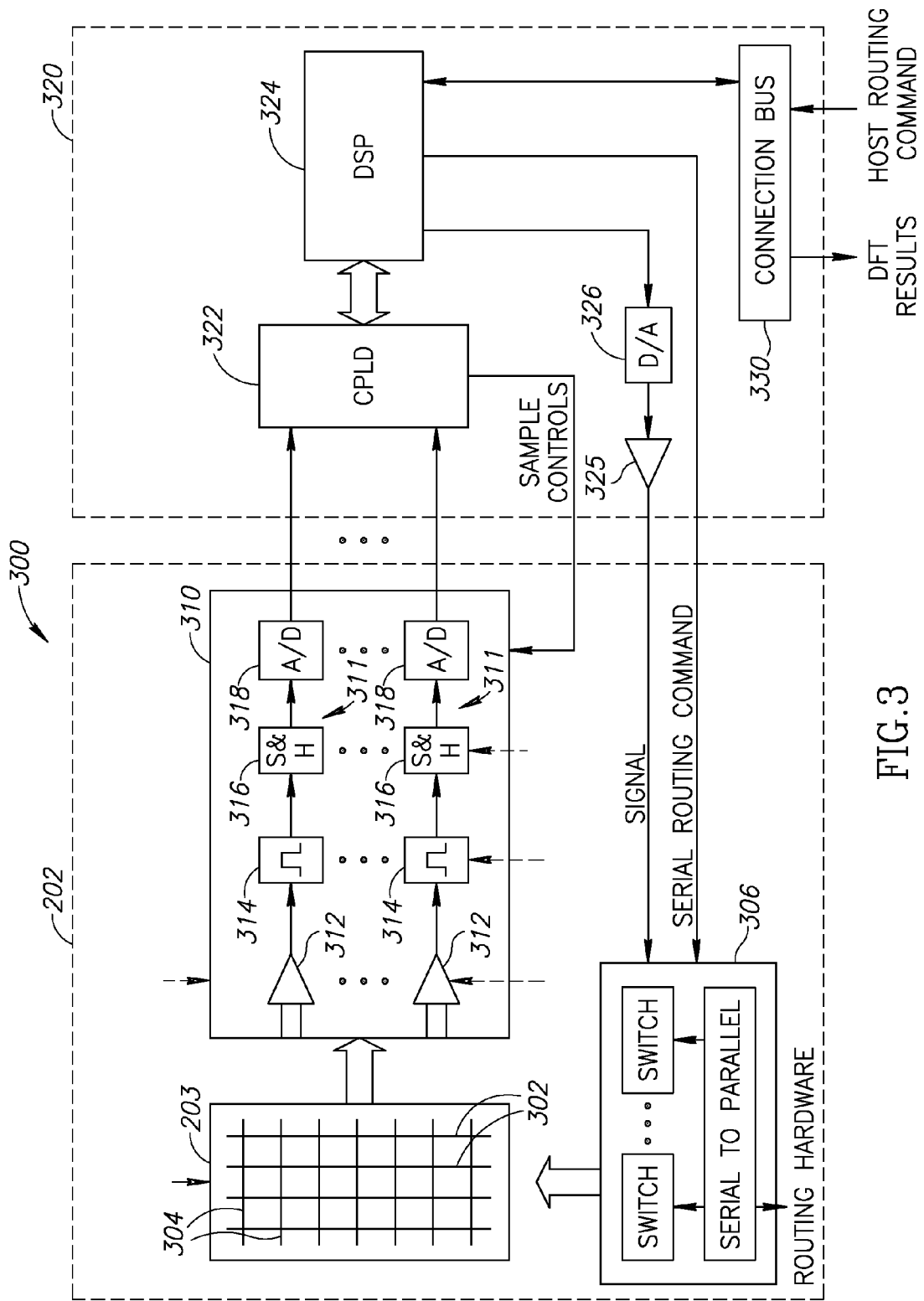
FIG. 3 is a block diagram depicting data flow in a sensor and a controller, in accordance with an exemplary embodiment of the invention.

FIG. 3 depicts a schematic 300 depicting data flow between the various elements of sensor section 202 and controller section 204 and to/from host section 206, in accordance with an exemplary embodiment of the invention.

As an overview of the operation of schematic 300 an object, such as object 102 or a finger or hand of a user, is placed on sensor array 203. As shown, sensor section 203 comprises a series of activated electrodes 302 (a first array of electrodes) and passive electrodes 304 (a second array of electrodes). Switching apparatus 306 applies an AC signal, optionally a pulsed AC signal, to at least one of activated electrodes 302. Signals in the range from 10 to several 10s of kHz are considered to be suitable for the present invention, although higher and lower frequencies may be used. A signal is transferred, by capacitive coupling, to each of passive electrodes 304. It should be understood that in some embodiments of the invention, even when no object is placed on the sensor, a signal is transferred to passive electrodes due to parasitic capacitance at the junctions—the "steady state vector". Passive electrodes 304 are each connected to sensor electronics 310, optionally in the form of an ASIC and optionally comprising a series of sensor lines 311. Each sensor (pipeline) line 311 optionally includes an amplifier 312 with a high input impedance, a filter 314 which filters out signals that are not near the frequency of the AC signal, and a sample and hold circuit 316 which periodically samples the filtered signals and transfers them to an Analog to Digital converter 318 to convert the sampled voltages into digital form. Thus sensor line 311 converts AC signals present on a passive electrode with which it is associated into a digital signal that represents the signal coupled to that electrode from the particular activated electrode that is activated. These signals are later analyzed by the controller which sends further information (characteristics of the signals, such as magnitude of the received signals, calculated DFT, phase etc.) to the host computing device which determines the position/orientation/identification etc., as described below.

Electronic circuitry 320 optionally receives the digital values from A/Ds 318 and processes then for transfer to a host via a connection bus such as an RS232, RS-422, RS-423 or USB connection, or any data transfer bus known in the art. Electronic circuitry 320 also receives commands from the host via connection 330. Digital Fourier Transformation (DFT) is optionally performed on the digitized signal by DSP 324 to calculate the magnitude and phase of the coupled signal at a specific frequency namely the frequency of the signal inputted on the activated electrode.

Optionally, DSP 324 receives routing commands (e.g., which activated electrodes should be activated and when) and based on these commands generates serial routing commands to switch AC sources (e.g., the output of amplifier 325 via an analog/digital converter 326) to a desired activated electrode or electrodes. CPLD 322 optionally provides sampling commands to unit 310 to activate the sample and hold circuits and the A/D.

Electronic circuitry which can be in the form of an ASIC or separate components or which can be combined with sensor electronics 310 in a single ASIC, optionally includes Complex Programmable Logic (CPLD) 322, to convert the signal from electrodes 304 from serial representation into parallel representation (in short, the CPLD is a 'Serial to Parallel' converter) which is passed to a Digital Signal Processor 324, such as a TMS320VC5402, which optionally identifies and/or determines the position and/or the orientation (or any other relevant information) of an object, for example paddles 108, 110 placed on a surface of apparatus 100. The methodology used for these tasks is described herein.

In an exemplary embodiment of the invention, electrodes 302 and 304 are substantially transparent such that sensor array 203 is transparent. In an embodiment of the invention, as indicated above, sensor array 203 is overlaid on a display such as an LCD display. This display can be configured to show the game board (or any other background that is appropriate to the task being performed by apparatus 100) as well as variable information responsive to movement of the objects 102 or to commands from a host (not shown).

It is noted that the structure of the tablet (except for the absence of an excitation coil) can be generally the same as that described in US 2004/0095333, the disclosure of which is incorporated herein by reference, and that the electronics described in this reference can be similar to that utilized in the exemplary embodiment of the present invention. In an embodiment of the invention, an excitation coil is used with apparatus 100 along with electromagnetic objects, which are optionally excited by the excitation coil. However, it is noted that there is no switching of inputs in the device shown in US 2004/0095333 and that thus switching apparatus 306 is not present. In addition, while in US 2004/0095333 the differential amplifiers have inputs from different electrodes into their two inputs, in the device shown in FIG. 3 only one of the inputs of the differential amplifiers is used, being connected to a single one of the passive electrodes 304. The other input is connected to a reference voltage. It is also noted that in some embodiments of the invention, the overall display size is larger than that of a tablet. Optionally, a plurality of displays are tiled together.

It should be understood that the electronics described above (and in the incorporated references) and the division of tasks between the various circuitry and between the circuitry and the host is exemplary only and is not meant to be limiting. Other ways of dividing the tasks and other circuitry will occur to persons of the art. Thus, it may be more advantageous to have more computation performed in the DSP to reduce the data flow between the computer and the host. It may also be useful for the scanning to be completely controlled by the electronics shown in FIG. 3, rather than receiving commands from the host. Other changes will occur to persons of skill in the art.

The inventors have found that a small conductive element (token) such as those described below, when placed on an electrode crossing causes the coupled signal to increase by about 10%, apparently by increasing the capacitive coupling between activated and passive electrodes. The presence of a finger, on the other hand, decreases the coupled signal by 20-30%. As described in more detail below, with respect to FIGS. 7A and 7B, this difference is measured and processed to produce an indication of the presence of a token or finger at the electrode crossing, in accordance with an embodiment of the invention.

In some embodiments of the invention, the activated electrodes are activated serially, for example by switching a signal from an amplifier 325 into particular lines based on a serial routing command which controls the switches in apparatus 306, as described above.

Figure 15:
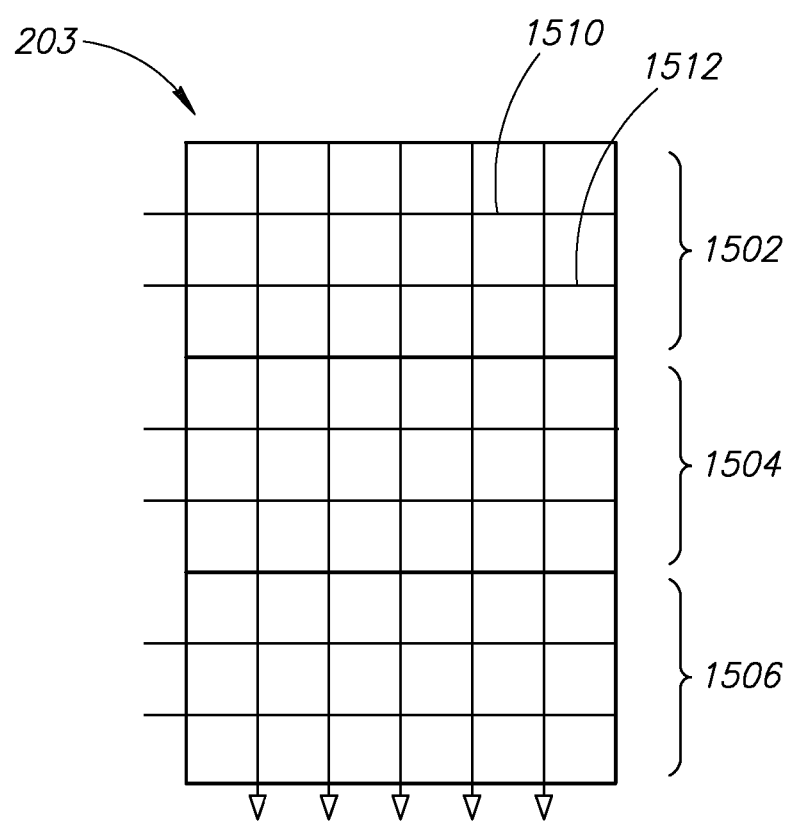
FIG. 15 shows a sequentially activated sensor array, in accordance with an exemplary embodiment of the invention.

In order to speed up report rate, such as shown in FIG. 15, the active electrodes 302 are divided into a number of groups 1502, 1504, 1506 wherein the active electrodes (such as 1510, 1512) in each group are activated sequentially but the groups work simultaneously. This can be accomplished only by using a handful of non-mutually interfering (orthogonal) frequencies which are used to activate electrodes 302. For example, at a sampling rate of 200 kHz, exemplary frequencies of 20 kHz, 30 kHz, and 40 kHz are used. In some embodiments of the invention, this handful of frequencies are assigned one to each group. It should be understood, however, that these frequencies change depending on the sampling rate, and that they are not limited to 3 frequencies, as 20 kHz, 30 kHz and 40 kHz are by way of example only.

Figure 4:
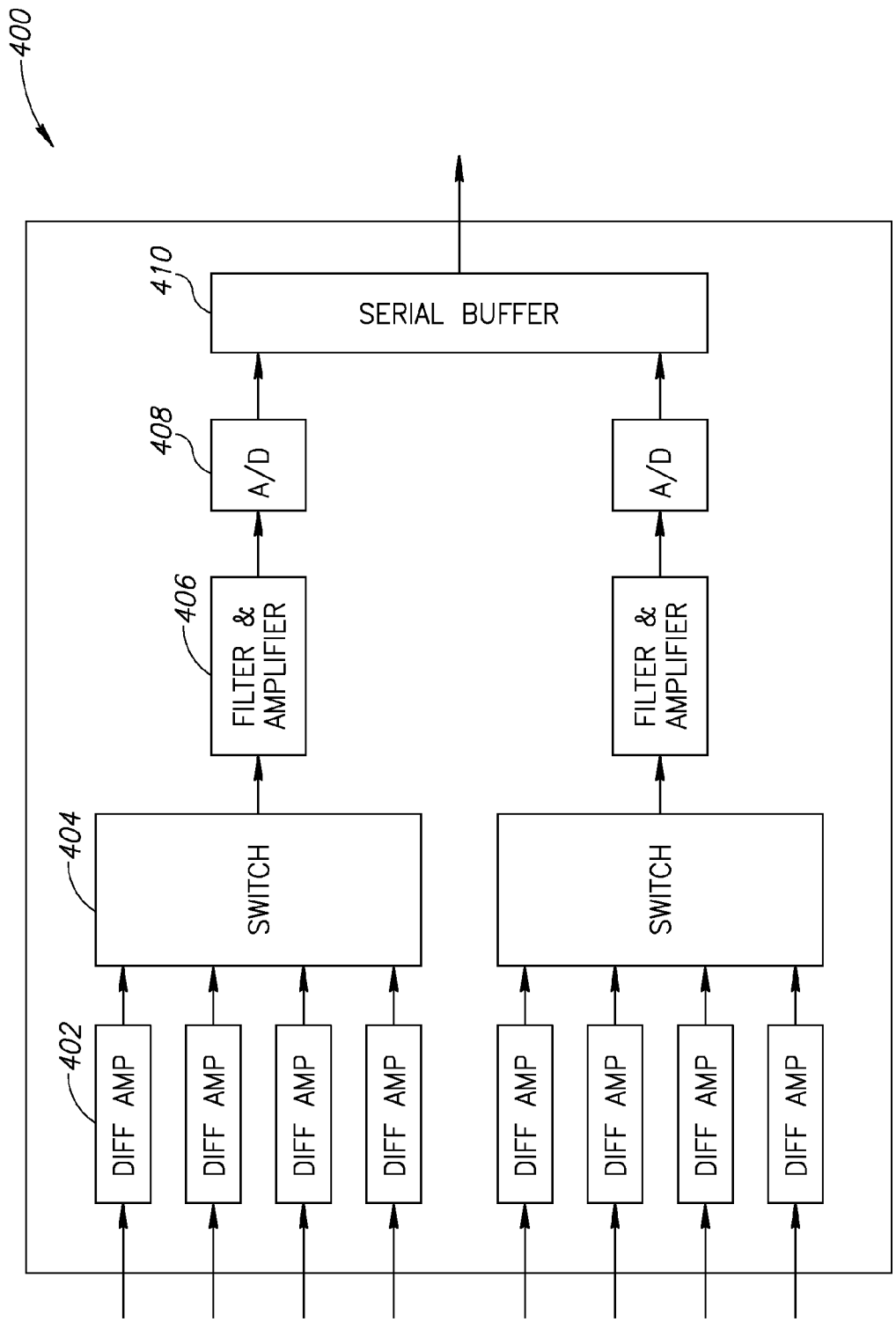
FIG. 4 is a general schematic diagram of a sensor electronics optionally implemented as an ASIC, in accordance with an exemplary embodiment of the invention.

Alternatively, a source is connected to each of the activated electrodes 302 and each source supplies a signal at a different frequency to different electrodes. With somewhat more complex sensor electronics it would then be possible to determine the position much faster without any signal scanning. Furthermore, the system could be made much more sensitive to movements of objects, since software algorithms running on DSP 324 could compare signals before and after movement. Referring to FIG. 4, an application-specific integrated circuit ("ASIC") 400 schematic (corresponding generally to sensor electronics 310 of FIG. 3) is shown. Essentially, an ASIC is a microchip designed for a particular application. Each passive electrode 304 is optionally connected to an input of a differential amplifier 402. The other input of the differential amplifier is optionally connected to a DC reference voltage, to avoid signals on neighboring or remote lines generated by the same or other tokens canceling each other. The differential sensor signal is amplified and forwarded to a switch 404, in accordance with an exemplary embodiment of the invention. Optionally, switch 404 selects one or more (a sub set) of a plurality of inputs to be processed further.

In an exemplary example where only a single element is in use (such as a stylus of pointer) then only inputs corresponding to inputs near the previous position of the element are sampled. In applications where multiple objects are in use, and where objects are placed on and removed from the surface, then the entire surface is scanned.

In an exemplary embodiment of the invention, the selected signal is amplified and/or filtered by the filter and amplifier 406. The resultant signal is then sampled by an analog to digital converter 408, in accordance with an exemplary embodiment of the invention. The signal is then sent to CPLD/DSP 322/324 located in electronics 320 (FIG. 3), optionally via a serial buffer 410, in an exemplary embodiment of the invention.

In some exemplary embodiments of the invention, each ASIC 300 contains two identical channels. Optionally, each ASIC 300 channel is comprised of four (4) differential inputs to allow sampling as close as possible to the passive electrodes. It should be noted that while these electrodes (as well as the activated electrodes) ideally should have a low impedance to reduce noise and pick-up in an actual situation, the electrodes may have relatively high impedance such as several hundred thousand ohms or more. This may be desirable in order to increase the transparency of array 203. However, under other circumstances, in which a lower impedance is possible, a single ASIC which handles all of the passive electrodes may be used. Alternatively, separate amplifiers, filters and A/D may be provided for each line.

Figure 5:
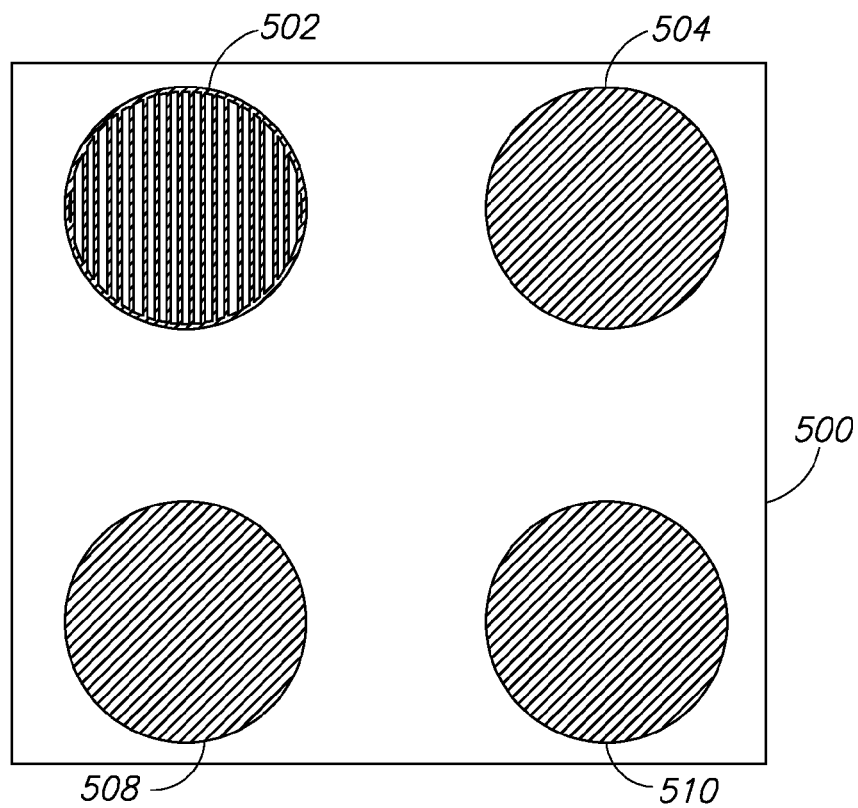
FIG. 5 is a configuration of tokens located on an object, in accordance with an exemplary embodiment of the invention.

In some exemplary embodiments of the invention, ASIC 300 is provided with a shutdown capability, which switches ASIC 300 off. Optionally, CPLD/DSP 322/324 shuts down ASIC 300 or puts it into a hibernate mode whenever it is not needed, in order to reduce energy consumption. In some embodiments of the invention, ASIC 300 is periodically and/or temporarily activated by CPLD/DSP 322/324 to sample sensor array 203 for activity FIG. 5 shows a pre-determined configuration of tokens 502, 504, 508 and 510 located on the bottom of an object 500, in accordance with an exemplary embodiment of the invention. Patterns or configuration such as these and those shown in FIGS. 6A-F, 10-12, and 16A-D can be used to identify an object information code and/or determine the orientation of the object containing the tokens.

It should be noted that in the object shown in FIG. 5, the tokens are not necessarily all the same in all embodiments. For example, at least one token 502 has a modified capacitance (described below) pattern. In general, the configuration of tokens is placed at or generally beneath a detection surface of an object. In an exemplary embodiment of the invention, some tokens, such as tokens 504, 508 and 510 of FIG. 5, are 100% coated with a conductive material, such as copper.

In principle, it is believed that a token with more area covered by conductive material will create greater capacitance on the junction touched by the detection surface of the object, thus its coupling effect will be greater than a token with less conductivity. However, in other exemplary embodiments of the invention, tokens have a smaller percentage of coverage of conducting material, modifying their capacitive coupling. The token patterns themselves are optionally variable. Different levels of conductivity (and hence of capacitive coupling) can be achieved by using different conductive materials. Optionally, the distance from the conductive material to the sensor array 203 is adjustable for different tokens by placing a dielectric layer between the conductive material and the outer surface of the object. This variation results in varied amounts of capacitive coupling as well. In some exemplary embodiments of the invention, the diameter of a token is equal to twice the distance between two close edges of consecutive electrodes plus the width of an electrode. Optionally, the diameter is larger or smaller than the above, depending on the needs of the application. Using a token at least this large assures that the token covers a plurality of junctions, which makes determination of the center of the token more accurate.

Figure 6A:
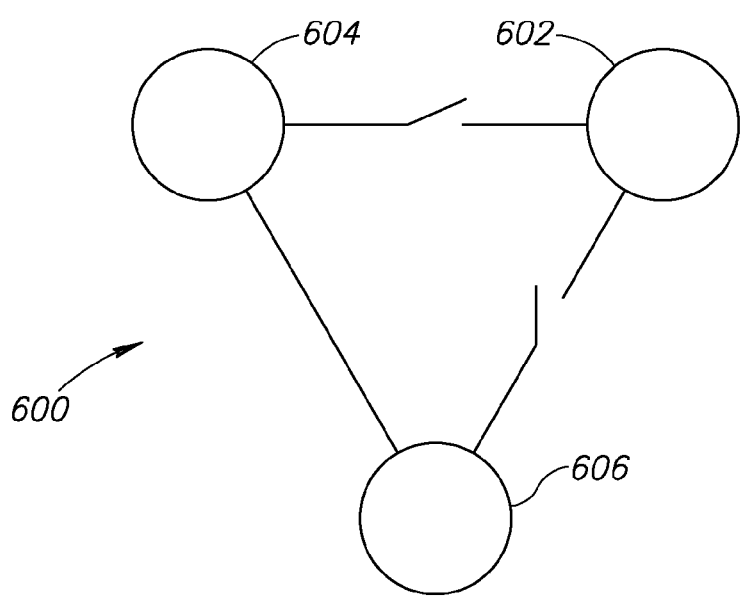
FIGS. 6A-C show an object provided with at least one switch for selectably changing the conductive pattern of the object, in accordance with an exemplary embodiment of the invention.

In some embodiments of the invention, the conductive signature of an object is selectively changeable, for example to change its object information code (identity). FIG. 6A shows a physical object 600 provided with a pattern of tokens 602, 604, 606 on the bottom of object 600. It can be seen in this embodiment that the pattern has a generally triangular "footprint" or form and that tokens 604 and 606 are each selectively connected to token 602 by a connection switch. In an embodiment of the invention, connection switch material is conductive so that when the switch is closed, a connection is made between the tokens on either side of the switch changing the pattern configuration and which in turn alters the sensor array 203 detectable signature. In an embodiment of the invention, the diameter of each token is smaller than the distance between two electrodes on sensor array 203. It should be understood that the arrangement shown in FIG. 6A is by way of example only, and does not indicate any required scale or shape. Furthermore, in the embodiments depicted in FIGS. 6A and 6D, the conductive signature of the objects is changed by flipping a switch, it should be understood that some objects are provided with the ability to physically change dimensions, causing at least one token 652 to physically move 656 in relation to at least one other token 654 of the pattern, and subsequently changing the identity of the object 650, as shown in FIG. 6E.

Figure 6B:
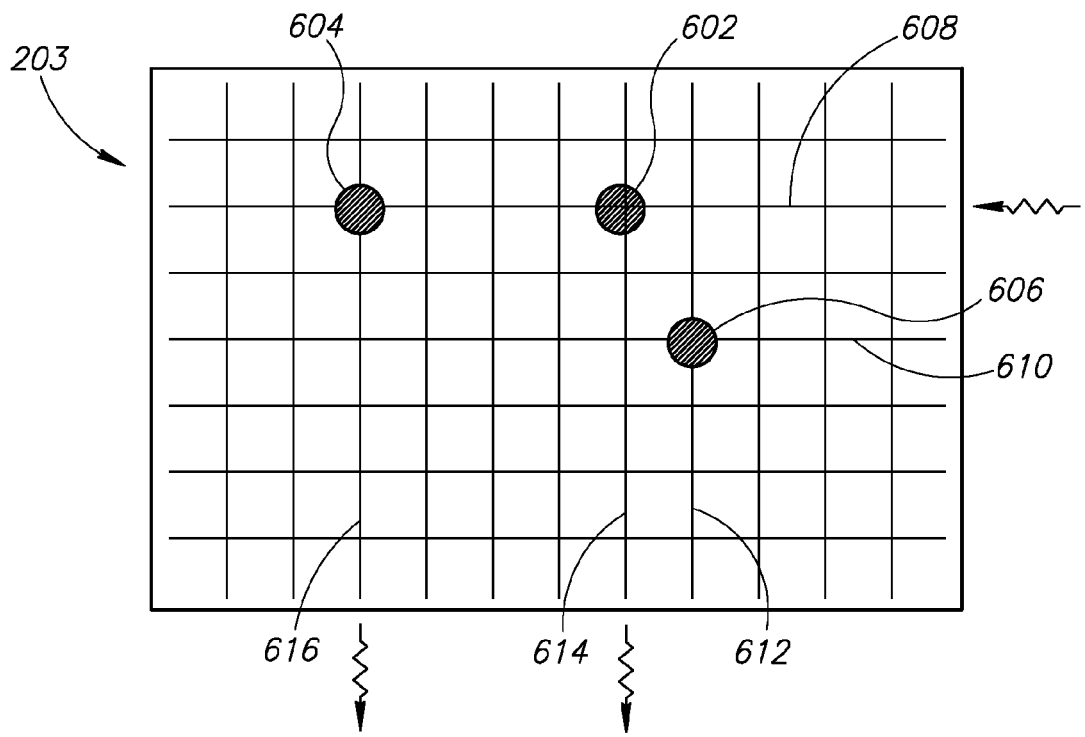

FIG. 6B shows a footprint of object 600 positioned on sensor array 203 where the switches are turned off, in accordance with an exemplary embodiment of the invention. In an embodiment of the invention, a signal is applied to activate an electrode 608. A signal is transferred, by capacitive coupling due to the presence of tokens 602 and 604 at two junctions on electrode 608, to passive electrodes 614 and 616. In a similar manner, when a signal is applied to activate electrode 610, a signal is detected on a passive electrode 612. Optionally, electrodes 608, 610 (or groups of electrodes, as described above) are activated seriatim.

Figure 6C:
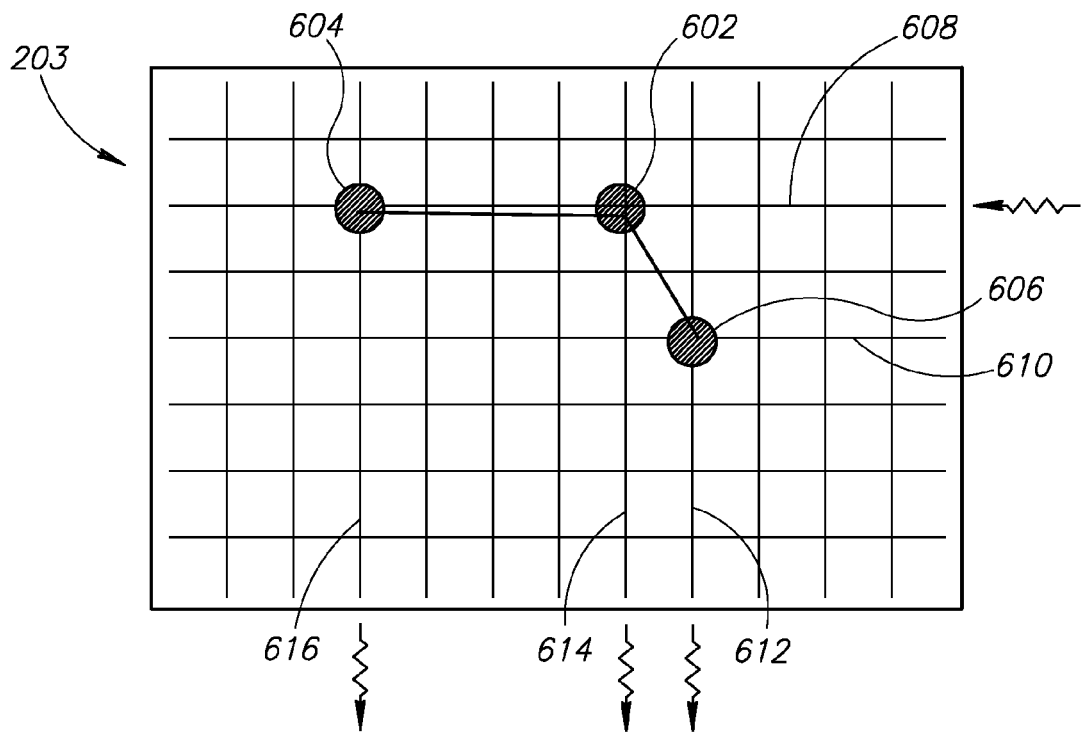

Referring to FIG. 6C, footprint of object 600 is shown positioned on sensor array 203 where the switches are turned on, in accordance with an exemplary embodiment of the invention. In an embodiment of the invention, turning the switches on creates a conductive connection between tokens 602, 604 and 606. As a signal is applied to activate electrode 608, a signal is transferred, by capacitive coupling due to the presence of tokens 602 and 604 at the junctions, to passive electrodes 614 and 616, enabling an output signal to be detected at those electrodes. Since tokens 602 and 606 are in conductive connectivity, the signal is also transferred to token 606. In an embodiment of the invention, this enables a signal to pass to passive electrode 612, which is also detected. Correspondingly, when a signal is applied to activate electrode 610, an output signal is detected on passive electrodes 612, 614, and 616 since all three tokens are in conductive connection. In a sense then, the identification of object 600 has been changed by turning the switched from off to on, since the application of signals to the input of sensor array 203 produces two different outputs based on the on/off configurations. In some embodiments of the invention, two switches are used for an object, instead of one in order to avoid ambiguity. An ambiguity can arise in a situation where only one switch is used and the two tokens which are connected by the switch are placed on the same passive electrode, preventing the system from differentiating between the on and off configurations.

Figure 6D:
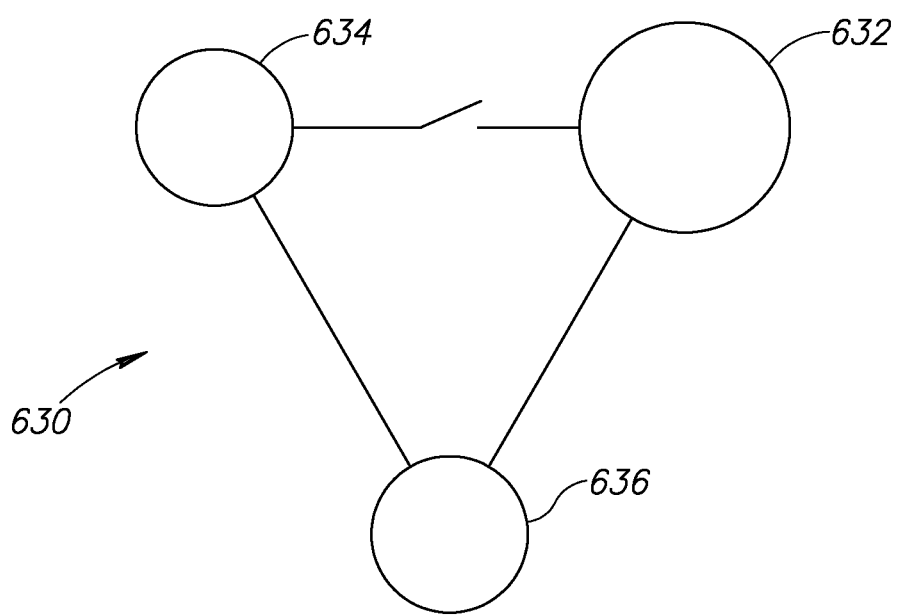
FIG. 6D shows an object provided with at least one switch and at least one enlarged token for changing the conductive pattern of the object, in accordance with an exemplary embodiment of the invention.
Figure 6E:
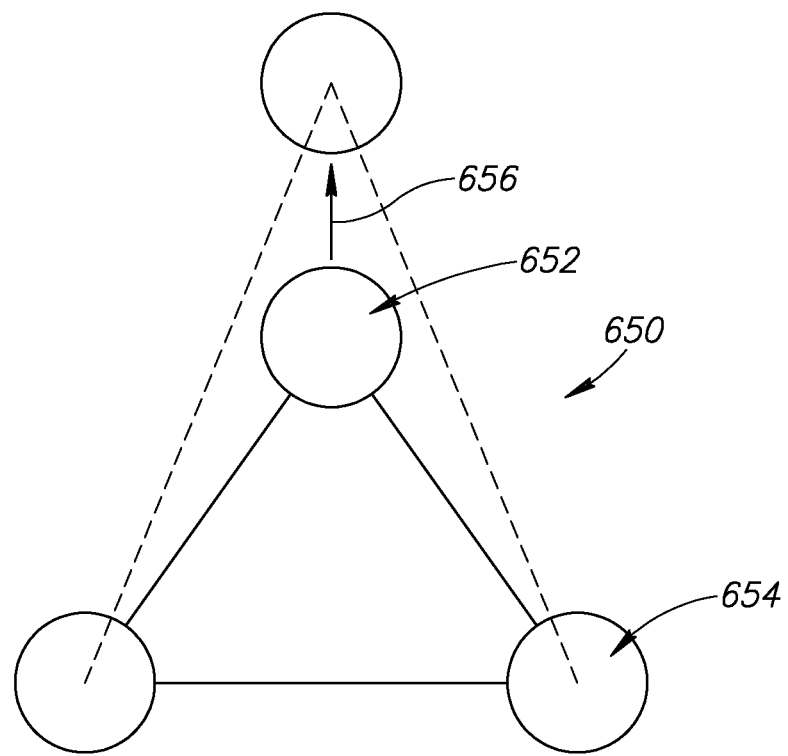
FIG. 6E shows an object which changes its conductive pattern by physically moving at least one token, in accordance with an exemplary embodiment of the invention.

In an exemplary embodiment of the invention, token of different sizes are used instead of two switches in order to resolve the above described ambiguity. Such an embodiment is shown in FIG. 6D, wherein an enlarged token 632 is provided to an object 630. The operation of object 630 with respect to sensor array 203 is substantially similar to the operation described with respect to object 600, however it should be understood that the enlarged nature of token 632 exhibits a different capacitive signature on sensor array 203 than token 602 or the other two tokens 634, 636 on object 630. For example, in an embodiment of the invention, enlarged token 632 is sized to touch at least one more electrode than the other tokens.

The different on and off configurations of the switch, which can be referred as the different conductive states of the object can be deduced from the signals detected at the passive electrodes, as shown in FIGS. 6B-C. In an embodiment of the invention, when the object is a game piece, the different conductive states of the object can indicate different 'modes' of the game piece. For example, different players (one mode can represent a king and the other queen), different status (a "dead" or "living" player), different colors of player, and the like. Optionally, the conductive state change can invoke an action that the object performs, for example shooting, hitting, etc. In some embodiments of the invention, the tokens are sized so that the diameter of the tokens assures that the token covers at least one junction. Optionally, each token covers more than one junction. It should be understood that the shape, size, conductive material, and/or geometric pattern created by the tokens is variable to indicate a variety of identities to the object on which the tokens are located.

It should be noted that while an object's position and to some extent its identification can be determined by locating one token thereon, a plurality of tokens are optionally used, as shown in the example depicted in FIG. 5, for example to increase the number of possible separately identifiable objects and/or to allow for optional determination of orientation of the object. An object is optionally represented (and identified) by a unique combination and number of tokens and optionally, the varied conductivity of (or capacitive coupling induced by) one or more of them. This enables discernment between specific objects and also allows for determination of orientation as well as location.

For example the position of the object 500 in FIG. 5 can be defined as the intersection of connecting lines drawn across the diagonals between the centers of the tokens located at the corners of the object. Its orientation can optionally be determined according to the different capacitive coupling of the token located thereon and this can be determined upon conducting an analysis of a delta value of the tokens located on the object. The delta value of a token or finger is a difference (amplitude and phase) between a signal detected on the respective passive line in the presence of the token or finger and a steady state signal present when no token is present.

Figure 7A:
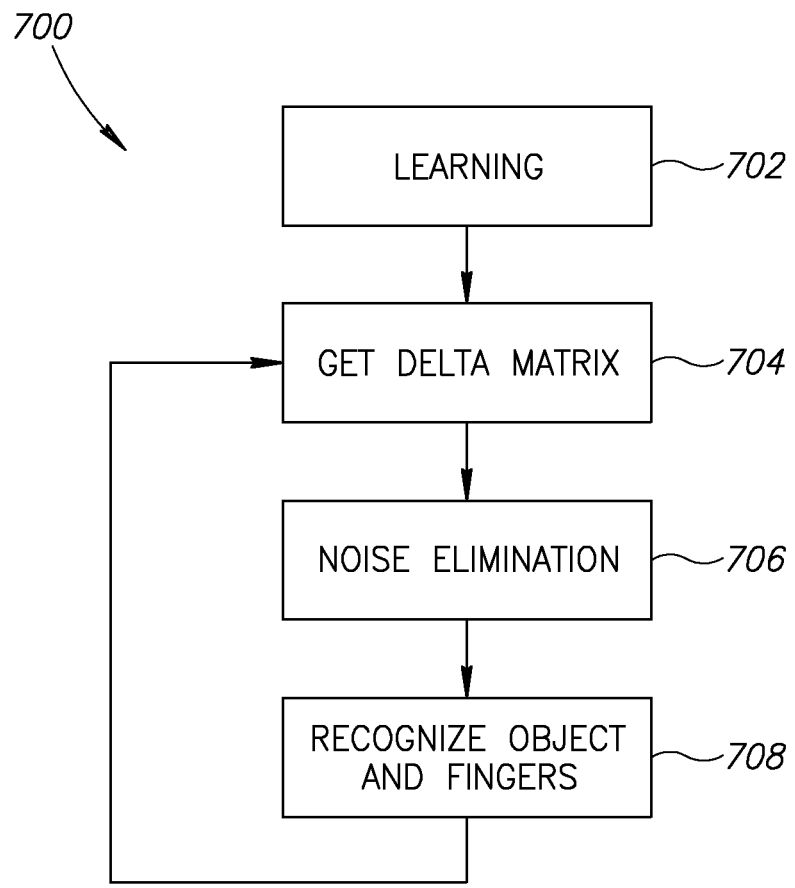
FIG. 7A is an exemplary method for determining object and/or finger contact, in accordance with an exemplary embodiment of the invention.

A number of exemplary methods are provided for using the apparatus 100 described above. In some exemplary embodiments of the invention, methods are used to calculate whether a finger or an object is located on apparatus 100. In some exemplary embodiments of the invention, methods are used to determine the center of a token. In some exemplary embodiments of the invention, methods are used to identify position, identification and/or orientation of an object located on apparatus 100. The area and magnitude of capacitive coupling can also be used to perform different functions such as 'scroll up', 'scroll down', and/or 'cursor' etc. Referring to FIG. 7A, a method for differentiating between object and/or finger contact and/or finger hovering is shown, in accordance with an exemplary embodiment of the invention. As described with respect to FIG. 3, when a conductive material, such as a token, is at a junction between an active electrode (y-axis) and a passive electrode (x-axis), then the voltage on the passive electrode will be larger than a voltage on it when there is no token at the junction. This stronger signal means a greater signal magnitude which is calculated using a discrete Fourier Transform ("DFT"), or other means such as an FFT, in accordance with an exemplary embodiment of the invention. A DFT or FFT is used since it conveniently acts to not only provide the amplitude and phase of the signal, but also to differentiate the signal from noise or signals at other frequencies. When the activated electrodes are activated by signals of different frequencies, then the FFT or DFT is a convenient way of determining all of the delta values for lines crossing the passive line being sampled.

Figure 7B:
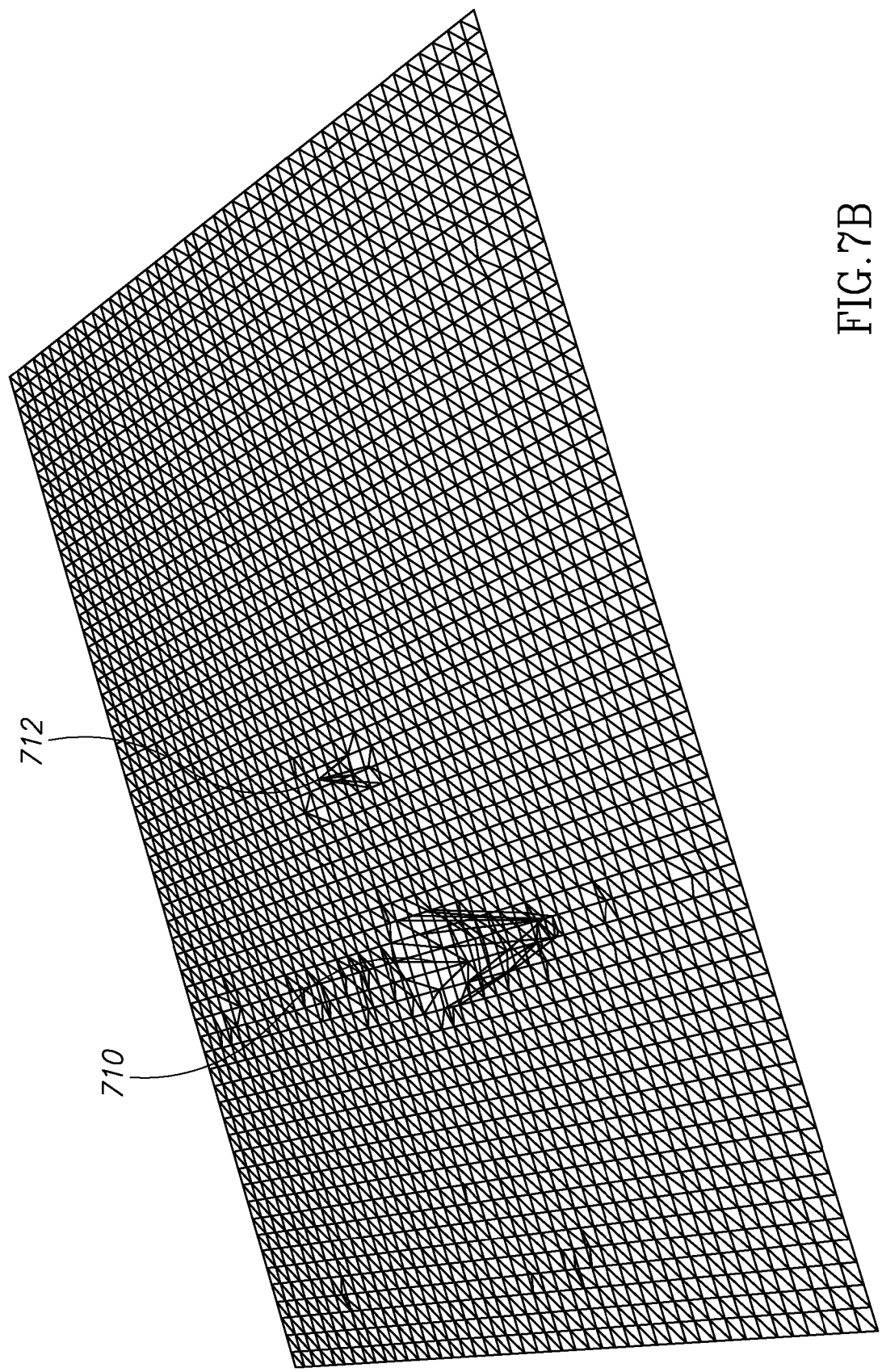
FIG. 7B is a graphic representation of a signal output indicating object and finger contact, in accordance with an exemplary embodiment of the invention.

As shown in FIG. 7B, a human finger 710 causes the opposite effect (i.e., signal reduction) of a conductive token 712, possibly because a human is can be modeled as a grounded added capacitance when touching the sensor array, whereas a token can be modeled as a floating added capacitance. This enables the system to easily differentiate between a token and a finger, in an embodiment of the invention. In addition, the strength of the signal for a finger allows differentiation between a finger touching the surface and one hovering above the surface, since both touching and hovering produce signals that are large enough to be reliably detected.

Method 700 for discerning between conductive object and/or finger contact commences with learning (702) a steady state vector and optionally various delta vectors between the various inputs and outputs of sensor array 203. In general, with no tokens or other elements on sensor array 203, the activated electrodes 302 are energized seriatim, and a steady state vector for a particular electrode 302 is calculated. The steady state vector comprises, as its elements, a steady state value (amplitude and phase) of the voltages induced for each of the passive electrodes, when the activated electrodes 302 are energized and no object is placed on or over the sensor. Optionally, other characteristics of the detected signal are used to calculate the steady state value. This process is generally performed in the factory, although it could also be performed regularly in the field.

Optionally, in a sensor array 203 where the behavior of junctions is homogenous, learning the steady state vector of only one junction might be needed. However, in some exemplary embodiments of the invention, each junction is measured because of the heterogeneous behavior of the junctions caused by different gains of amplifiers, different capacitance between transmitters and receivers, and other effects. The matrix containing the steady state values is optionally stored for comparison with measured signals.

Characteristic delta values are determined for various tokens of different "strengths." In general, a conducting line parallel to the activated electrodes is placed over a column of junctions. The outputs of the passive electrodes are then subtracted from the steady state vector for that activated electrode to provide a characteristic delta vector of that particular conductor. Optionally, this conducting line is then moved to the next activated electrode to produce the next delta vector of that particular conductor and that particular electrode 302.

Delta vectors may also be determined for various capacitive coupling levels, to improve the ability of the system to discern differences between them. Since different capacitive tokens cause different amounts of coupling, they can be differentiated by providing multiple thresholds for the coupled delta signals to allow for identification of the capacitive coupling. It is not believed necessary to provide an array of different characteristic delta values for fingers; a single characteristic delta value is believed to be sufficient. In some embodiments of the invention, a second threshold is established for detecting a body part which is hovering over sensor array 203, but not actually touching it.

At least one object and/or finger is placed on the sensor array 203 while apparatus 100 is in use for determining object information, in an exemplary embodiment of the invention. A delta value is calculated (704) for each junction in order to discern between object and/or finger contact or hovering. In an exemplary embodiment of the invention, scanning to determine the presence of an object and/or a finger located on or near (hover) sensor array 203 is performed in the same method described during the learning (702). In an exemplary embodiment of the invention, delta current DFT results are generated based on the measured signal from each junction respectively and a delta vector is calculated by subtracting the steady state DFT results from the current delta DFT results. Optionally, the delta vectors are stored and compared with the characteristic delta values determined in the learning phase to identify what is causing the coupling.

In an exemplary embodiment of the invention, noise reduction or elimination is performed (706) on signals generated during the polling of the junctions, as described above, during actual operation (see 708). Optionally, noise reduction or elimination is also performed during learning (702). Optionally, noise is reduced (in addition to the filters shown in FIGS. 3 and 4) by routing a signal to the transmitters which is of a predetermined, specific frequency and performing DFT at said specific frequency on the sampled signal thereby eliminating noise signals at irrelevant frequencies. Optionally, noise reduction is performed (706) by determining the phase of a vector. For example, despite their great influence on the magnitude of the steady state signal, the influence of both fingers and conductive materials on its phase is minor. Thus if a conductive material touches a junction its corresponding delta vector phase in the delta matrix will be close to the steady state vector phase. However, if a finger touches a junction its corresponding delta vector phase in the delta matrix will be close to 180 degrees from the steady state vector phase, since 180 degrees represents a decrease in the magnitude of the signal. Noise reduction can optionally be performed by eliminating any measured delta value with a phase outside of those two approximately known phase regions i.e. any delta value with a phase not close to 180 degrees from the steady state vector phase or not close to the steady state vector phase, for example ±10 degrees or ±20 degrees. Optionally, noise reduction is performed (706) by increasing the time the activated electrodes 302 are energized, which improves SNR (Signal to Noise Ratio). Optionally, the passive electrode 304 is sampled several times and an average value of the measurement is calculated.

During actual operation of the system, recognition (708) of a finger and/or a conductive object, such as a token, is performed by analyzing delta values, in accordance with an exemplary embodiment of the invention. According to an exemplary embodiment of the invention, a junction can be determined to have been touched by a finger if its corresponding delta value (optionally after noise reduction) has a magnitude over a certain threshold and its phase is approximately 180 degrees from the previously measured steady state value. If its phase is approximately 180 degrees and its value is below that threshold but above a second threshold, then the situation is identified as hovering. In contrast, a conductive object (token) provides a different measured effect, and thus a junction can be classified as having been touched by a conductive object if the delta value has a magnitude sufficiently over that of the steady state and its phase that is similar to the steady state phase. The different tokens can be identified by utilizing a delta matrix defined for different "strengths" as described above.

An exemplary approximation method for finding the center of a token is now described, in accordance with an exemplary embodiment of the invention. In an exemplary embodiment of the invention, the closer the center of a token is to a junction, the greater the measured delta vector of the junction will be. By using this knowledge, measurement of delta vectors of various junctions allows for an approximation of the token's center location.

Measurements are made when an activated electrode is actually energized and a delta vector is calculated according to methods described herein. This delta value contains the deltas of the responses of all of the passive electrodes to this energizing. In general a map of the delta values (a matrix of values defining the coupling between each input and each output) is determined.

A determination is made of which junctions contain a token. Delta values for neighboring junctions are compared, to determine which measured junction has the higher delta value. This higher value is used to determine the center of the token. The junction with the higher delta vector sets the x and y coordinates of the center of the token. Optionally, an error correction is made to correct for the fact that the token may not be directly on the junction. By adding or subtracting d/4 from these (x,y) coordinates at each axis, depending on which is the direction of the crossing with the next higher delta value, the maximum possible error is reduced. This is not a strict requirement. "d" is the distance between electrodes' center, which can vary depending on the resolution required in a particular embodiment. In an exemplary embodiment the spacing is 4 mm from center to center. In an exemplary embodiment the width of each electrode is 1 mm.

In an exemplary embodiment of the invention, errors in the calculation of each coordinate are bounded by d/4 and the total calculation error is bounded by $d/\sqrt{8}$.

A weighting method for finding the center of a token, in accordance with an exemplary embodiment of the invention, is now described. Instead of identifying the closest junction to the token's center, choosing that junction as the center and then correcting slightly for error, this method uses a measurement of more than one junction in order to determine the center of a token, in an exemplary embodiment of the invention. The junctions are measured for their delta values (as in the previously described method) in order to determine a starting point for pinpointing the location of the center of the token, in some exemplary embodiments of the invention. This will generally result in a delta matrix of values. A junction identified as having the highest delta values as compared to surrounding junctions is chosen to be the reference location (x,y) in the formulas below. The delta value of at least one neighboring junction, generally the junction with the next highest delta value, in each direction is utilized to determine the coordinates of the center of the token.

In general, the two highest delta values in each axis are used and the center is computed to be the junction with the higher value corrected by movement to the junction with the next higher value equal to the distance between the junctions multiplied by the ratio between the delta values. Optionally, the ratio is a function of the delta values at the junctions. Optionally, the ratio is calculated by dividing the delta value of the next higher value and the sum of the delta values. Alternatively, more complex schemes can be used utilizing more neighbors and/or different formulas.

Figure 8:
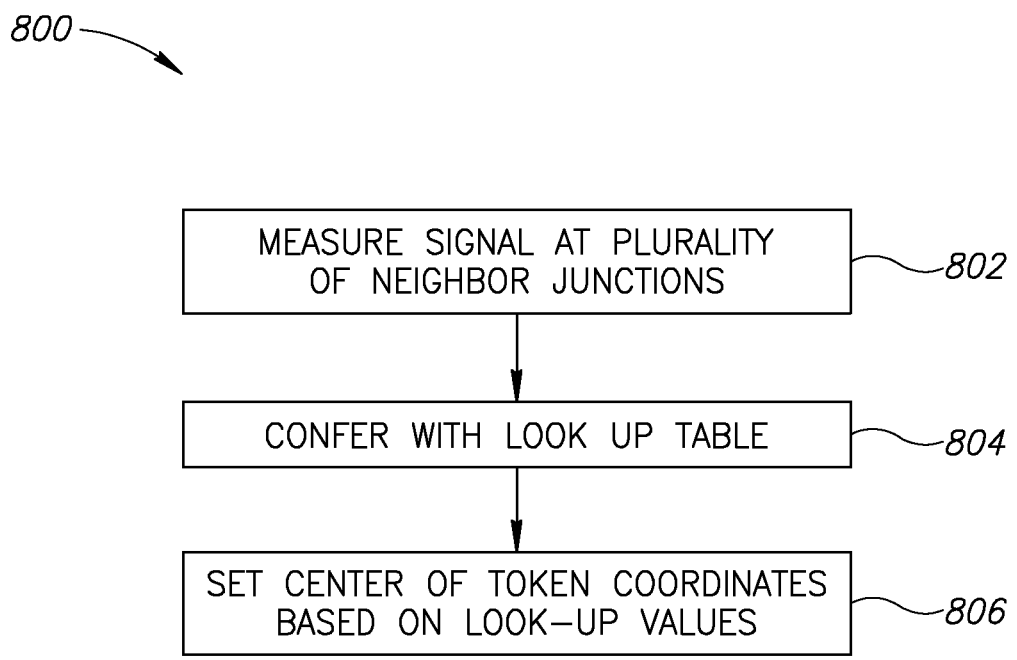
FIG. 8 is an exemplary look-up table method for finding the center of a token, in accordance with an exemplary embodiment of the invention.

Referring to FIG. 8, an exemplary look-up table method 800 for finding the center of a token is shown, in accordance with an alternative exemplary embodiment of the invention.

In some exemplary embodiments of the invention, the center of a token can be determined by measuring and considering (802) the delta values of junctions in proximity to the token. In some exemplary embodiments of the invention, four (4) junctions are measured. Optionally, two (2) junctions are measured. Optionally, more or fewer junctions are measured depending on the accuracy requirement for finding the center of the token. Once measurements of delta vectors are determined, conferring (804) with a look-up table provided with previously determined delta vector measurements should provide an approximate location of the center of the token. Optionally, the look-up table is comprised of experimentally derived results. Optionally, the look-up table is comprised of mathematically modeled results. It should be noted, that the more values that are located in the look-up table, the higher likelihood of accurate location of the center of the token. Once values in the look-up table can be correlated to the measured delta vectors (for example, using a mean square error method), the x and y coordinates of the center are set (806).

In some exemplary embodiments of the invention, the center of a token can be determined by a combination of the described methods. Optionally, an averaging of several results obtained from the different methods described is used in order to calculate the center of token.

Figure 9:
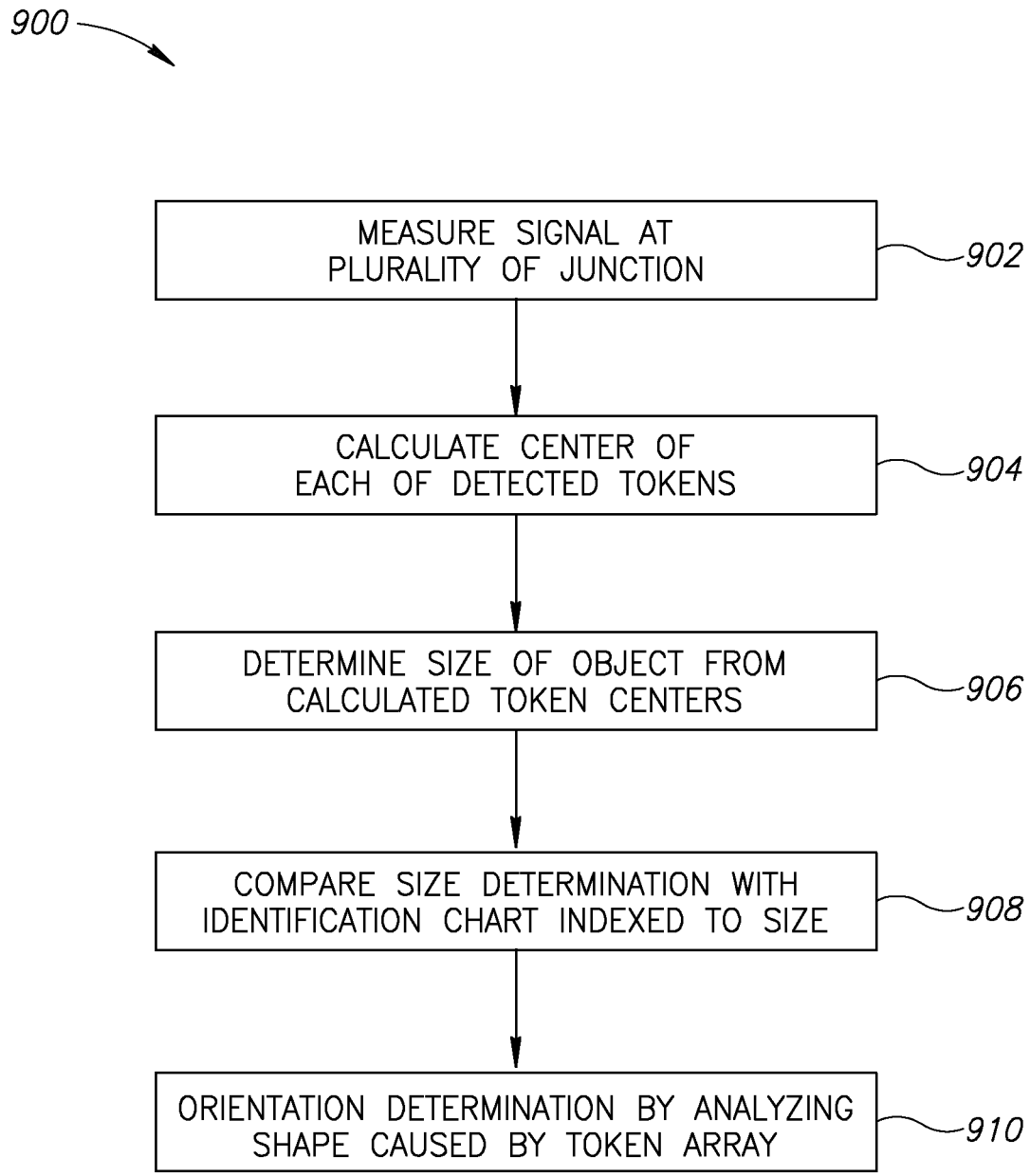
FIG. 9 is an exemplary geometric method for finding the identification, orientation and/or position of an object, in accordance with an exemplary embodiment of the invention.

FIG. 9 depicts an exemplary geometric method 900 for finding the identification, orientation and/or position of an object, in accordance with an exemplary embodiment of the invention. By using a geometric pattern created by an array of tokens located on an object, apparatus 100 optionally determines identification, orientation and/or position information of the object. A plurality of junctions of a sensor array 203 are measured (902) in order to determine if a pre-defined geometric pattern of tokens exists and if so, which geometric pattern. Once at least one token is detected by sensor array, using apparatuses and methods such as described herein, the center of each token is optionally calculated (904) in order calculate the identification and positioning of the object of which the token is a part. An analysis of a plurality of tokens allows for the determination (906) of size and/or shape of the pattern of the tokens, for example defined by a line or lines connecting the centers of the tokens, and/or any other shape attributes (perimeter/area/contour) of the object with which the tokens are associated. Comparison (908) of the determined size or other attributes to a look-up table comprised of size and other identification associations permits the identification of a particular object.

Figure 10:
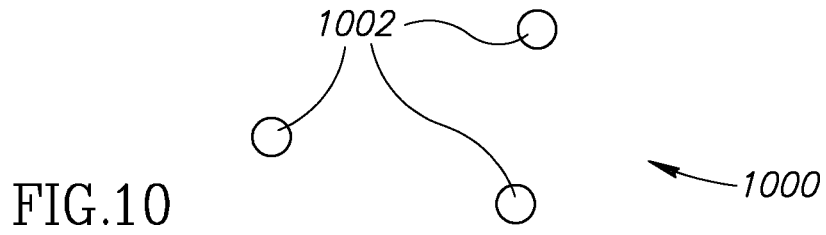
FIGS. 10 and 11 illustrate two different exemplary geometric structures of token patterns usable in embodiments of the present invention.
Figure 11:
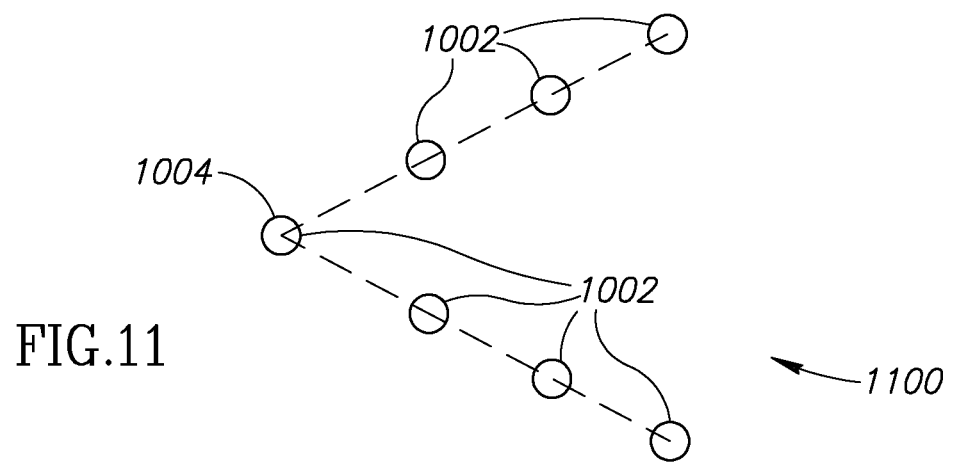

Before going on to the next act (910), it will be useful to discuss several exemplary token patterns which allow for both identification and orientation determination. FIGS. 10 and 11 describe two different exemplary geometric structures of token patterns usable in embodiments of the present invention.

FIG. 10 shows a pattern 1000 of tokens 1002 on the bottom of an object which pattern has a triangular form. In this embodiment the different objects are distinguished by the distances between the tokens being distinguishable, i.e., the distances used in two different objects having a measurement accuracy which is better than the difference in the distances. In order to avoid size misidentification the allowed distance between centers for different patterns must be greater than four times the error of the method used for finding the center of a token. In order to assure that direction determination is unambiguous equilateral triangles are optionally not used. Optionally, an isosceles triangle is used. Optionally, the system is capable of distinguishing between several lengths, in accordance to the different possible combinations, several isosceles triangles are used. For example, if 3 different lengths are used, there are 6 different combinations for isosceles triangles. Additionally, optionally or alternatively, the object information code can be determined based on a pattern of different capacitive couplings in the tokens. In addition, different sizes of tokens can be used. Optionally, different conductivity density can be used in each token.

FIG. 11 shows a pattern 1100 of tokens 1002 in the form of a V. In this embodiment, most of the identifiable objects will not have one or more tokens shown in the pattern. In an embodiment of the invention, token 1004 is present and has a distinctive coupling value or size. At least one of the tokens should be present in each of the sides of the arrow, so that direction can be determined unambiguously, in some embodiments of the invention. Once the positions of the tokens that are present are determined, a template matching algorithm is optionally used to determine which the object information code of the object being identified and what its direction is. While an object with seven tokens is shown, a greater or lesser number can be used, depending on the number of identifiers required. In addition to possibly having one or more missing token in the pattern, some of the tokens may have a different capacitive coupling value. Optionally, some of the tokens 1002 may have different size. Optionally, the distance between the tokens 1102 varies between different objects.

Figure 16A:
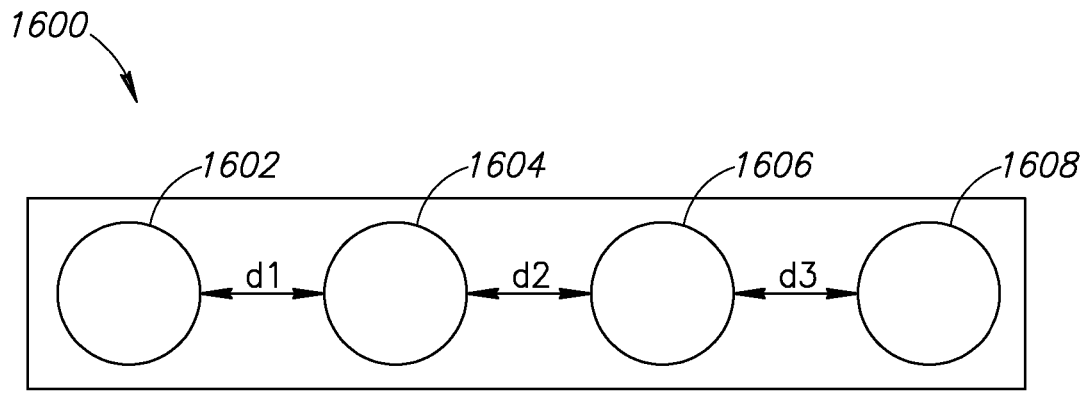
FIGS. 16A-B show distance sensitive identification patterns for an object, in accordance with an exemplary embodiment of the invention; and, FIGS. 16C-D show binary sensitive identification patterns for an object, in accordance with an exemplary embodiment of the invention.
Figure 16B:
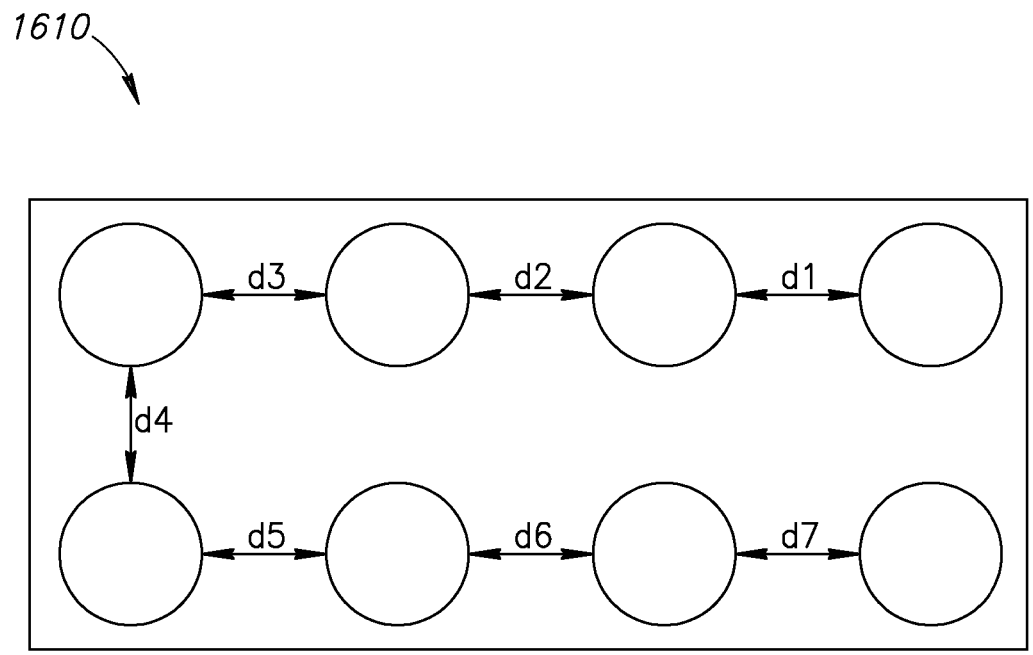

In an embodiment of the invention, an object information code of an object is detected by recognizing distances between tokens. FIG. 16A shows a pattern 1600 of tokens 1602, 1604, 1606 and 1608 which are positioned proximal to sensor array 203, in an embodiment of the invention, when the object is placed on sensor array 203. Using the detection methods described herein, the object information code of the object can be determined by measuring the detected distance between the tokens, for example d1 between token 1602 and token 1604, d2 between token 1604 and token 1606, and d3 between token 1606 and token 1608. The analysis which results in the measurement of d1, d2, and d3, which are measured from the center of token to the center of token, enables the identification of the object which is known to have this d1, d2, d3 configuration. In order to increase the number of possible identities, the number of rows and/or columns of tokens can be increased, the tokens themselves can be of varying size, the conductivity of the tokens can be varied, and/or the distances between the tokens can be varied, as examples. FIG. 16B shows a pattern 1610 which consists of two rows and 4 columns of tokens, with up to 7 possible distances between the various tokens (more if the rows are not consistently parallel to each other). In some embodiments of the invention, a predetermined number of predefined distances are used for identifiers. Taking pattern 1600 of FIG. 16A as an example, there are 4 tokens and 3 distances (d1, d2, and d3). If there are 5 options for distances and the size of the tokens is fixed, there are $5^3$ total possible identities for the object.

Figure 16C:
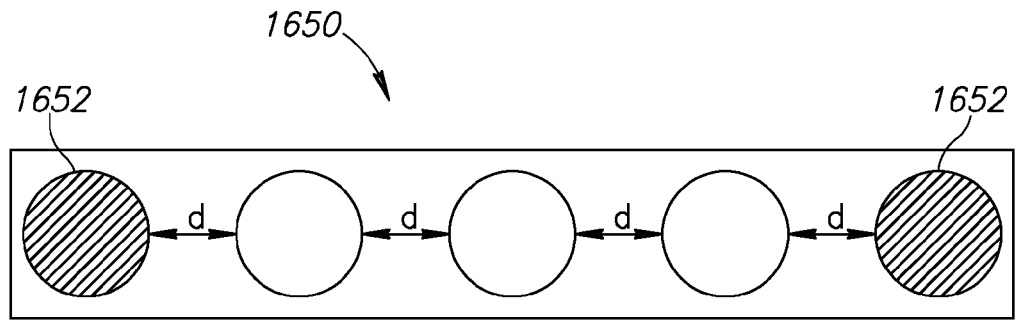
Figure 16D:
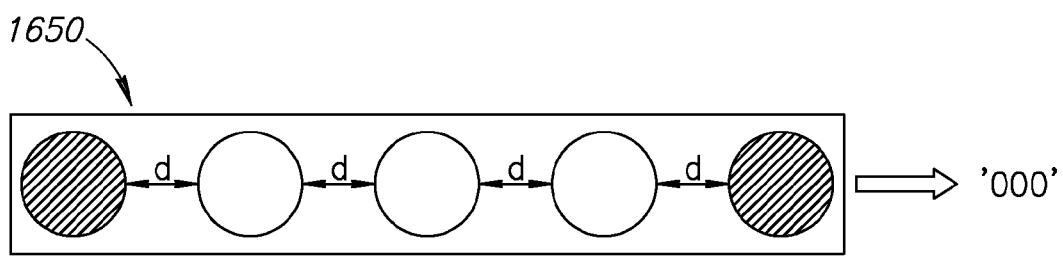
Figure 16D:
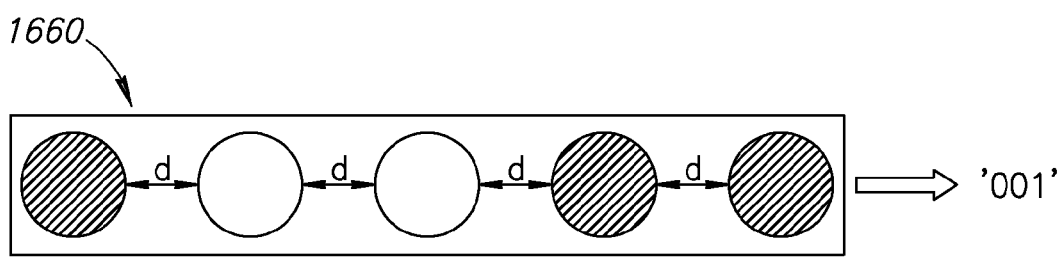
Figure 16D:
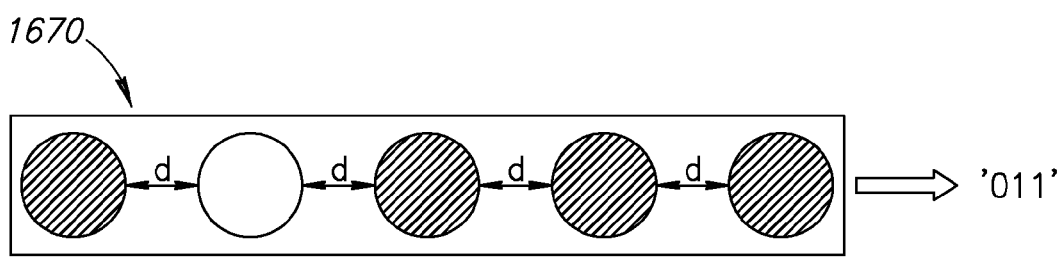

In an embodiment of the invention, a binary pattern is used to identify an object. The binary pattern is implemented, in an embodiment of the invention, by predefining a distance, d, between token slots and either placing a token in the slot, indicating "1", or leaving the slot empty, indicating "0". Optionally, a different capacitance and/or token size is used to indicate "1" or "0". In some embodiments of the invention, bracket slots 1652 are used to signal a start and end of the binary pattern. FIG. 16C shows binary pattern 1650 in which the bracket slots 1650 are filled but no tokens are located in each of the other slots, indicating a "0 0 0" pattern. FIG. 16D shows two other identity patterns 1660 and 1670, which exhibit the identities "0 0 1" and "0 1 1" respectively. In some embodiments of the invention, the number of slots in a row are increased or decreased (i.e. the number of columns is increased). Optionally, the number of rows is increased. In some embodiments of the invention, the distance, d, between the tokens is large enough that individual slots can be detected but is small enough to enable the pattern to be used with a game board sized object.

One problem that may arise is the determination of which tokens belong to which objects, since it is possible that the positioning of the objects is such that tokens of adjacent objects form triangles or arrows that could themselves signify objects.

Figure 12:
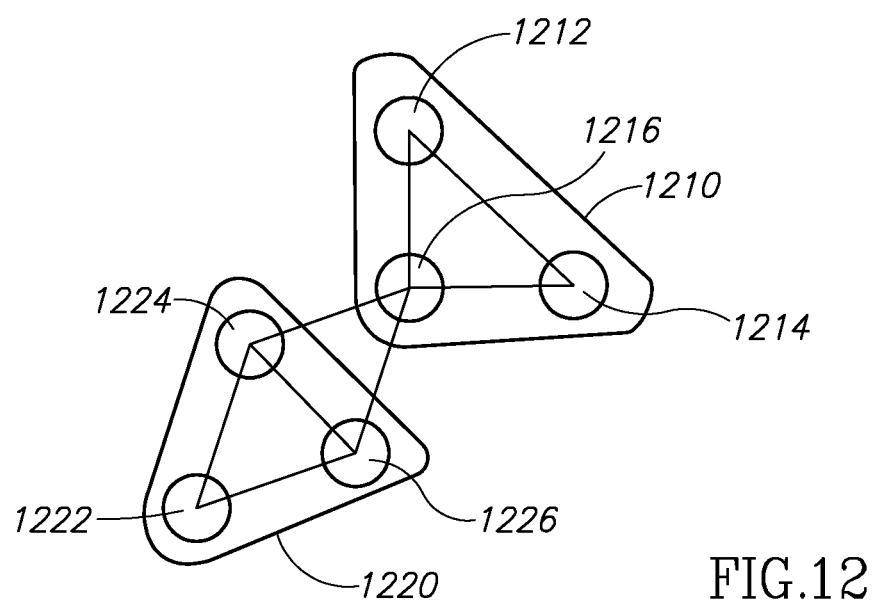
FIG. 12 shows such a possible configuration in which two objects are close enough so that there is ambiguity as to which objects are present.

FIG. 12 shows such a possible configuration in which two objects are close enough so that there is ambiguity as to which objects are present (i.e. what object information code would be detected). Two objects 1210 and 1220 are present each with 3 tokens. It is noted that the patterns of tokens on the objects themselves are different so that if the association of tokens with objects is made, then there would be no problem in identifying the objects themselves.

It is noted that object 1210 has three tokens 1212, 1214 and 1216, while object 1220 has three tokens 1222, 1224 and 1226. However, tokens 1216, 1224 and 1226 form a triangle that meets the requirements described above.

To solve this potential problem, the grouping of tokens as part of objects follows the following procedure:

(a) Find all the token's centers.

(b) Pick one of the tokens and check if it can be a part of more than one valid triangle (for example, if only isosceles triangles are supported, a triangle that is not isosceles is invalid. In addition, the triangle sides should be equal to one of a possible set of permitted lengths).

(c) Select a token that is a part of ONE valid triangle—'mark' all the tokens participating in said triangle as 'used'.

Optionally, the patterns of the objects are determined such that such a token exist. Optionally, the sizes of the triangles are determined in a way that assures that such a token exist.

(d) Repeat (b) and (c) for all the 'not used' tokens—establish all the valid triangles. Each triangle corresponds to a single object.

In order to assure that two tokens do not affect a single junction, sufficient margin should be a minimal distance between every two tokens, either on the same object or in different objects.

Returning to FIG. 9, in some exemplary embodiments of the invention, orientation information is determined by apparatus 100 using a geometric method. Naturally, certain shapes are not entirely equilateral. Use of shapes which have at least one side not the same as the others allows for a determination of orientation (910), in an exemplary embodiment of the invention. For example, three tokens can be located on a triangle shaped object, wherein one side of the triangle is a different length than the other two sides, which are equally sized. An analysis of the position information of the tokens reveals the base of the isosceles triangle-shaped object. Orientation is optionally indexed according to the base in some convenient and/or useful manner. Optionally, the orientation of the object corresponds to a line orthogonal to the base of the triangle. In some embodiments of the invention, the geometric center of the object is considered its position on sensor array 203.

For the pattern of FIG. 11, the orientation of the object is easily determined from the direction of the arrow formed by the tokens that are present (and those that are missing). In making this determination it is helpful if the token at the point of the arrow has distinguishable characteristics (such as coupling value, size).

Figure 13:
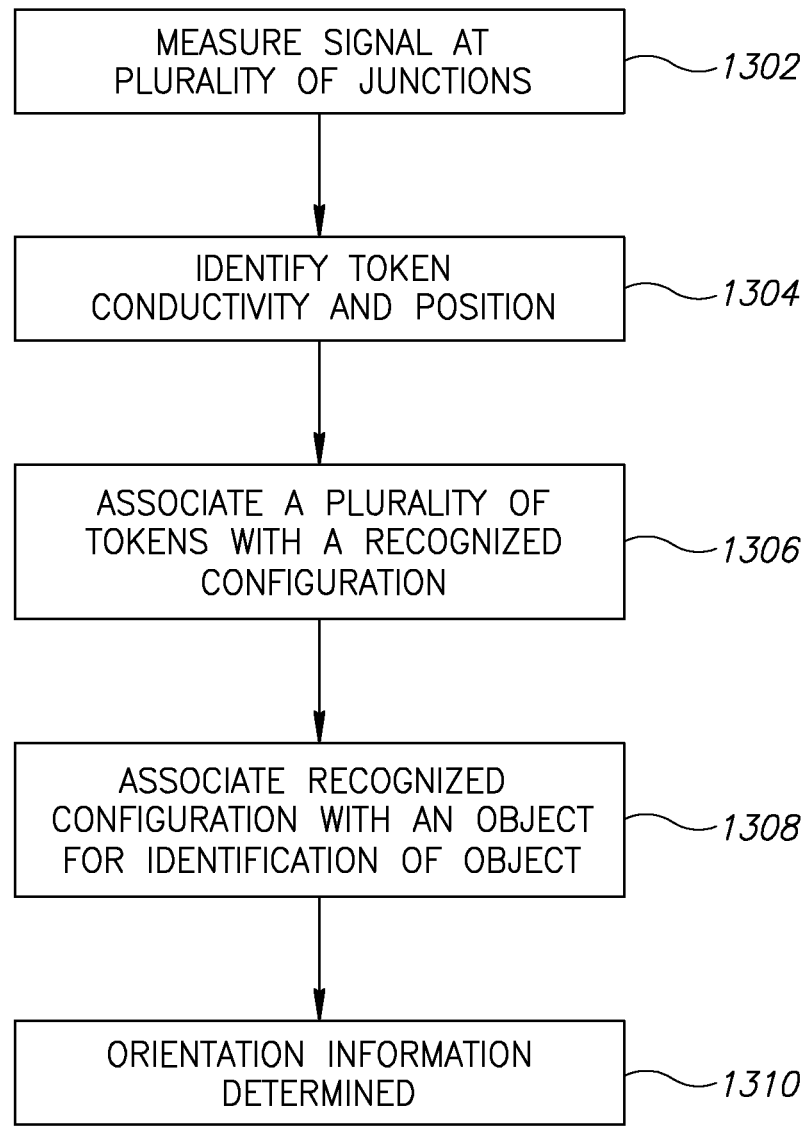
FIG. 13 is a flow chart of a method for finding the identification, orientation and/or position of an object, utilizing varied conductivity or capacitance of tokens, in accordance with an exemplary embodiment of the invention.

Referring to FIG. 13, an exemplary varied conductivity and/or size method 1300 for finding the identification, orientation and/or position of an object is depicted, in accordance with an exemplary embodiment of the invention. A delta value is measured (1302) for a plurality of tokens. Based on the measurement, specific tokens are optionally identified (1304) by the measured delta vector value. An analysis of a plurality of tokens identified thusly allows for their association (1306) to a specific configuration of tokens and hence a specific object can be associated (1308) with that pattern. In some exemplary embodiments of the invention, at least one token located on an object has a varied conductivity and/or size. As described in relation to FIG. 5, a varied conductivity token 502 is optionally incorporated into a recognizable multi-token configuration, such as shown in FIGS. 5, 6A-F, 10-12, and 16A-D. In some exemplary embodiments of the invention, the tokens of a recognized configuration are positioned at known locations on the object. Optionally, all objects identified utilizing this method are the same shape and size. Optionally as few as two tokens are used to provide information about an object. Optionally, more than two tokens are used to provide information about an object. Optionally, more than one varied conductivity token is used. Optionally, more than one size variable token is used. Optionally, each varied conductivity token is varied in conductivity from the others.

Orientation information of an object is also optionally determined (1310) using the varied conductivity and/or size method 1300. For example, a known orientation of the object is optionally associated with the tokens' configuration which incorporated at least one token which varies in its conductivity and/or size. Upon the analysis of the token configuration, including the identification of a varied conductivity and/or size token, the object's orientation can be known.

In accordance with some exemplary embodiments of the invention, the board can also be used as a tablet of a PC.

In one exemplary embodiment of the invention, the tablet has two configurations. In one of these configurations the tablet has the configuration and operation as described above and is used to find the position of objects, such as game pieces and/or fingers and optionally the orientation of the game pieces. In the other it reconfigured to have the configuration shown in US 2004/0095333 and it then functions as a transparent stylus sensitive display using electromagnetic stylus detection rather than capacitive coupling.

Figure 14:
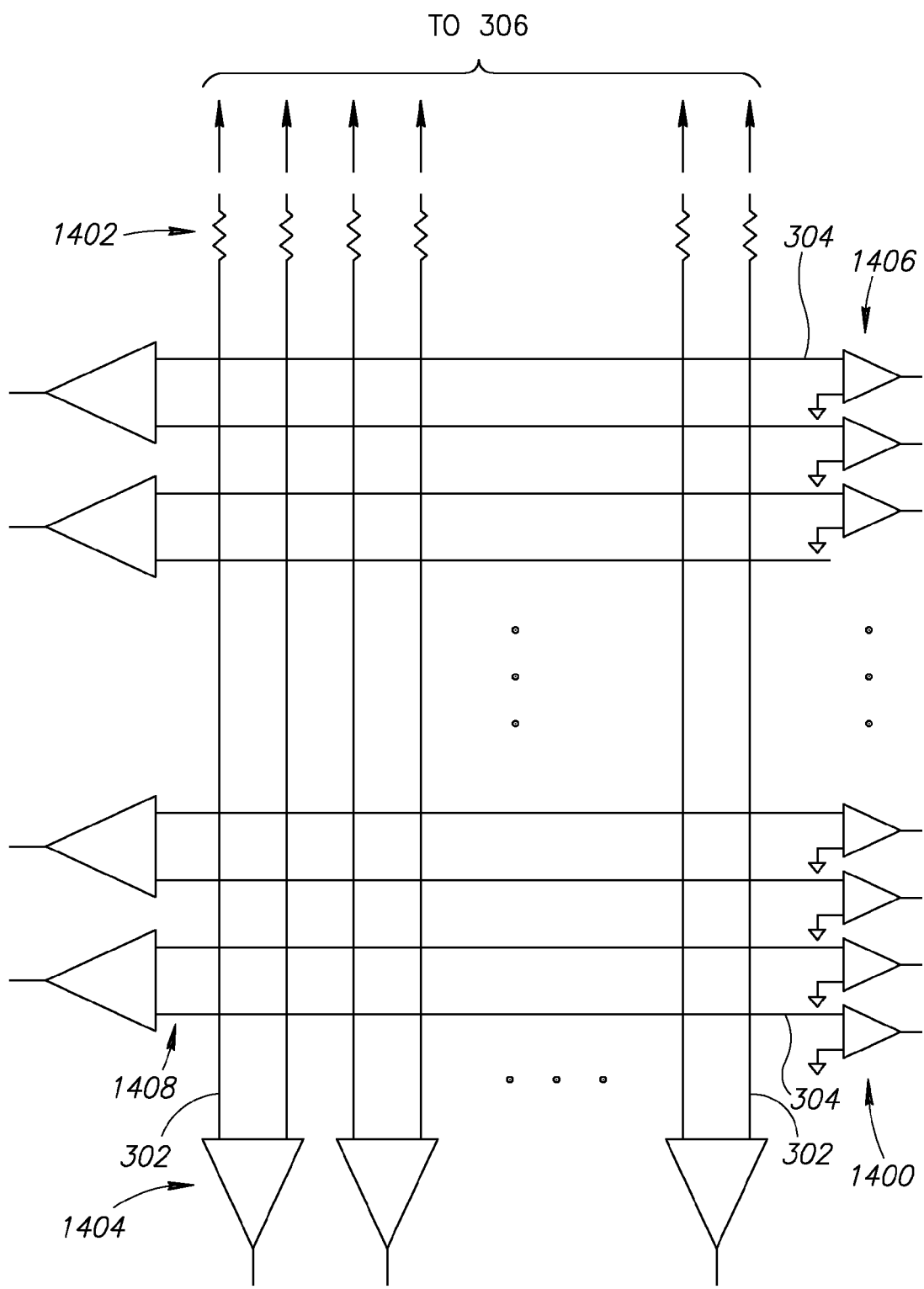
FIG. 14 shows a simplified schematic layout of a system for providing mode change over for a sensor array, in accordance with an exemplary embodiment of the invention.

An exemplary method of providing such a changeover is illustrated in FIG. 14, which shows a layout and sample electronics for a sensor array 1400. In this embodiment a change over must be made from the configuration disclosed above in which a signal is inserted in one set of electrodes and detected in the other set and a system in which the signal is generated in both sets of electrodes by an electromagnetic wave as in US 2004/0095333. In the following system, no switches are required (except for switches required to activate one or another electrode, e.g. apparatus 306 of FIG. 3). If switches can be accommodated, then the number of amplifiers can be significantly reduced.

A characteristic of the embodiment disclosed is that there are amplifiers on more than one end of the passive electrodes. Consider first the two ends of the activated electrodes 304. On one end, indicated as 1402, each of the electrodes is connected to apparatus 306 so that the activating signal is routed to the activated electrode which is to be energized. On the other end, indicated as 1404, a differential amplifier is connected to two lines as in US 2004/0095333. While connection of adjacent electrodes is shown, the variants shown in US 2004/0095333 are also possible. Alternatively to the connections from switching apparatus 306 being connected at end 1402 they can be connected at end 1404.

One end of passive electrode 304, designated 1406 has one input of a differential amplifier connected to each electrode. The unconnected input is connected to a bias voltage. This amplifier is used to determine the capacitive coupling as described above.

The other end of passive electrodes 304 designated 1408 has a configuration that is the same as that of end 1404 of the activated electrodes.

Optionally, the change over can be achieved by software solutions, by subtracting the detected signals at a pair of electrodes to obtain a differential signal, similar to the output of the differential amplifier. In addition, the stylus can be detected in a single ended configuration and not necessarily in a differential configuration.

In a second embodiment of the invention, a stylus is supplied with a conductive tip. In use, there is no need to reconfigure the tablet or electronics when it is desired for the device to operate as a stylus sensitive tablet, since the tip will cause a change in signal in the same way as does a token. This greatly simplifies the device. In addition, it is possible to provide a first type of stylus with a relatively small conductive tip for pointing or writing and a second stylus with a larger tip for erasing. Since the larger tip will be seen by a greater number of junctions and the coupling will be greater, the identification of which stylus is used can be easily determined. Alternatively, a single stylus could have two tips; one on either end of the stylus. One end has a narrow tip and the other has a larger tip (like a pencil with an eraser). Alternatively or additionally, the conductive tip can be provided in two parts, a first smaller part that is always at the tip and a second part surrounding the first part that is lowered to the tip when a button on the stylus is clicked. This change can also indicate "right clicking" of the stylus.

In another embodiment of the invention, the object is a mouse, where a conductive pattern is placed on its bottom surface. The mouse is for use over the display screen and can be used as a cursor. In addition, it is possible to provide a 'right click' button and 'left click' button, when pressing each one of these buttons a conductive token is lowered to the bottom surface of the mouse, which can be detected by the system, and indicates a 'right click' or 'left click' accordingly.

In some embodiments of the invention, the objects are hand held objects. In other embodiments the objects move autonomously on the surface and may be controlled by a controller via a wired or wireless connection. For example, the objects could be in the shape of a car and be motorized.

In some embodiments of the invention, movement of the objects is controlled by a robotic device controlled by a host or remotely via the internet.

In some embodiments of the invention the objects may have multiple detection surfaces, as for example a gaming die which generally has six sides marked with either 1-6 dots or numbers 1-6. In an embodiment of the invention, a material on each of the multiple detection surfaces, for example the dots, is conductive such that the conductive material acts as similar to an identification token. This enables the sensor array to determine the uppermost number by "reading" the number of dots facing the sensor array. It should be understood however, that a conventional gaming die is by way of example only and that identification of the multiple detection surfaces does not have to correspond to how sides of gaming dice are detected traditionally (i.e. with 1-6 dots on each side detected by the eye). Optionally, a token is not used per dot, for example where a distinctive conductive pattern is used on at least one of the multiple detection surfaces which corresponds to a number of dots and is detectable by the sensor array.

In another embodiment, the object is a game piece which can be reversed and has a different meaning depending on which side is up. For example, one side could represent a king in checkers or could identify the player, when the object is inverted, the other player is identified with the game piece.

Other multi-sided objects and their uses will occur to persons of skill in the art.

In an embodiment of the invention, finger and/or object touches are used to identify a person for security purposes. For example, a person could be issued a "key" which is comprised of at least one object having at least one token located thereon. Using the methods and apparatuses described herein, the key is placed on a sensor array, possibly at a predefined specific location on the array, and information about the key and optionally its location is determined, for example is the key valid and/or in the predefined valid location on the array. Optionally, finger touching, or even the contour of a larger body part, is detected in order to determine information about the finger or larger body part. Similarly to the key embodiment described above, this information is used to permit or deny security clearance to the person. In some embodiments of the invention, both an object such as a key and body parts are used in combination to validate the person. In some embodiments of the invention, a gesture made by a body part of a person is detected and identified for validation purposes.

It is to be understood that while the present discussion has centered on hardware and methods of operating the hardware, the present invention can be embodied in circuitry, hardware, software, computer readable media, and/or programmed computers that are configured and arranged to carry out the invention.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It should be noted that in the claims the term "control system" is used to denote a system for controlling the operation of the sensor array and may include a host computer.

It is noted that some of the above described embodiments may describe the best mode contemplated by the inventors and therefore may include structure, acts or details of structures and acts that may not be essential to the invention and which are described as examples. Structure and acts described herein are replaceable by equivalents, which perform the same function, even if the structure or acts are different, as known in the art. Therefore, the scope of the invention is limited only by the elements and limitations as used in the claims.

The invention claimed is:

1. A system for determining information regarding at least one object comprising:

a sensor sensitive to capacitive coupling, wherein the sensor includes a first and a second array of electrodes forming a grid;

an object configured to create a capacitive coupling with the sensor when at least one signal is input to the sensor such that output signals are produced on a plurality of electrodes of the sensor, a spatial pattern formed with a distribution of the output signals among the plurality of electrodes is an object information code; and a detector configured to measure said output signals and to determine from the spatial pattern, the object information code, said code providing information regarding a position of the object and information regarding identification or orientation of the object.

2. A system according to claim 1, wherein the object includes a plurality of conductive areas.

3. A system according to claim 2, wherein the plurality of conductive areas includes at least two conductive areas spaced apart.

4. A system according to claim 2, wherein the object includes conductive and non-conductive areas to provide a binary object information code.

5. A system according to claim 2, wherein the plurality of conductive areas is comprised of differently sized conductive areas such that some areas cause a different capacitive coupling than other areas.

6. A system according to claim 2, wherein the plurality of conductive areas is comprised of conductive areas, of which at least a first conductive area is located a first distance from a second conductive area which is located a second distance from at least a third conductive area.

7. A system according to claim 6, wherein the first and second distances are selected from a set of predefined distances.

8. A system according to claim 2, wherein at least two of the conductive areas are selectively in conductive connection with each other.

9. A system according to claim 2, wherein the plurality of conductive areas forms at least one of a plurality of rows, a plurality of columns or a geometric shape.

10. A system according to claim 1, wherein the measurement of said output signals is at least one of voltage, amplitude, phase, frequency, or correlation.

11. A system according to claim 1, further comprising:
a source of the input signal adapted to input the at least one signal to the first set of electrodes; and,
wherein the input signal is transferred to the second set of electrodes by the object capacitively coupled to at least one of the second set of electrodes.

12. A system according to claim 1, wherein the object is one of a plurality of objects, each with a different object information code.

13. A system according to claim 1, wherein the object is a game piece.

14. A system according to claim 1, further operable to detect a body part of a user.

15. A system according to claim 1, wherein the object comprises several surfaces, and wherein each surface comprises a different object information code.

16. A system according to claim 15, wherein the object is a gaming die.

17. A system according to claim 1, further comprising a display having an image that can be changed electronically displayed thereon.

18. A system according to claim 17, wherein the display underlies the sensor and wherein the sensor is substantially transparent.

19. A system according to claim 17, wherein the system is a personal computer.

20. A system according to claim 2 wherein the detector is operative to identify output signals associated with each of the plurality of conductive areas.

21. A system according to claim 20 comprising circuitry configured to determine the object information code based on the output signals associated with each of the plurality of conductive areas.

22. A system according to claim 2 wherein the detector is operative to determine a position of each of the plurality of conductive areas relative to the sensor.

23. A system according claim 22 comprising circuitry configured to determine the object information code based on the determined position of each of the plurality of conductive areas on the sensor.

24. A system for determining information regarding at least one object, comprising:
a sensor sensitive to capacitive coupling;
an object including a plurality of conductive areas spaced apart configured to create a capacitive coupling with the sensor when at least one signal is input to the sensor, such that a plurality of output signals are produced in response to the capacitive coupling to different parts of the sensor, a spatial pattern formed from a distribution of the plurality of output signals on the sensor is an object information code; and
a detector configured to measure the plurality of output signals on the sensor, and to determine from the spatial pattern, the object information code, and wherein the object information code provides information for determining a position of the at least one object.

25. A system according to claim 24, wherein the object information code provides information regarding identification or orientation of the at least one object.

26. A system according to claim 24 wherein the detector is operative to determine a position of each of the plurality of conductive areas on the sensor.

27. A system according claim 26 comprising circuitry configured to determine orientation of the object based on the position of each of the plurality of conductive areas on the sensor.

28. A system according to claim 24 wherein the detector is operative to determine output signals associated with each of the plurality of conductive areas.

29. A system according to claim 28 comprising circuitry configured to determine the object information code based on the output signals associated with each of the plurality of conductive areas.

30. A system according to claim 24, wherein the object is one of a plurality of objects, each with a different object information code.

31. A method for determining information regarding at least one object, the method comprising:
providing a sensor sensitive to capacitive coupling;
providing an object including a plurality of conductive areas spaced apart configured to create capacitive coupling with the sensor when at least one signal is input to the sensor, such that a plurality of output signals are produced from different portions of the sensor in response to the capacitive coupling;
measuring the plurality of output signals of the sensor associated with the plurality of conductive areas; and
determining from a spatial pattern formed from a distribution of the plurality of output signals from the different portions of the sensor an object information code and information for determining the position of the at least one object.

32. The method according to claim 31, wherein the sensor is comprised of two arrays of electrodes, a first array comprising a first set of electrodes and a second array comprising a second set of electrodes.

33. A method according to claim 31, wherein the object information code includes information regarding the identification of the object.

34. A method according to claim 31 comprising identifying the object based on the object information code.

35. A method according to claim 31 comprising determining an orientation of the object based on the spatial pattern.

36. A method according to claim 31 comprising determining position of each of the conductive areas on the sensor from the measured signal outputs.

37. A system for determining information regarding a plurality of objects, comprising:
a sensor sensitive to capacitive coupling, said sensor including a plurality of electrodes;
a plurality of objects, wherein at least one object of the plurality includes a pattern of conductive areas that is other than a pattern included on at least one other object of the plurality, the pattern configured to create a capacitive coupling with more than one electrode of the plurality of electrodes when at least one signal is input to the sensor; and
a detector configured to measure output signals from the more than one electrode associated with the pattern and to determine an object information code from a spatial pattern formed from a distribution of the output signals among the more than one electrode, and wherein the object information code provides the information regarding the object.

38. A system according to claim 37, wherein at least one of the plurality of objects includes a plurality of conductive areas.

39. A system according to claim 38, wherein the plurality of conductive areas includes at least two conductive areas spaced apart.

40. A system according to claim 37, wherein the pattern of conductive areas provides the object information code.

* * * * *